US006326963B1

(12) United States Patent
Meehan

(10) Patent No.: US 6,326,963 B1
(45) Date of Patent: Dec. 4, 2001

(54) METHOD AND APPARATUS FOR EFFICIENT ANIMATION AND COLLISION DETECTION USING LOCAL COORDINATE SYSTEMS

(75) Inventor: Patrick C. Meehan, Seattle, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/012,966

(22) Filed: Jan. 22, 1998

(51) Int. Cl.$^7$ ................................................. G06T 17/00
(52) U.S. Cl. ............................................. 345/419; 345/473
(58) Field of Search ................................... 345/473, 418, 345/419, 420, 474, 475

(56) References Cited

U.S. PATENT DOCUMENTS

| 5,014,230 | 5/1991 | Sinha et al. . |
| 5,030,946 | 7/1991 | Yamamura . |
| 5,056,031 | 10/1991 | Nakano et al. . |
| 5,363,475 | 11/1994 | Bajer et al. . |
| 5,572,634 | 11/1996 | Duluk, Jr. . |
| 5,581,665 | 12/1996 | Sugiura et al. . |
| 5,625,575 | 4/1997 | Goyal et al. . |

OTHER PUBLICATIONS

Blow, Jonathan, "Practice Collision Detection," Lecture#5101, pp. 119–130.
Hubbard, Philip M., "Interactive Collision Detection," Dept. of Computer Science, Brown University, Providence, Rhode Island, 8 pages.
Gottschalk, S., et al., "OBBTree: A Hierarchical Structure for Rapid Interference Detection,"*Computer Graphics Proceedings, Annual Conference Series, 1996*, pp. 171–180.
Hudson, Thomas C. et al., "V–Collide: Accelerated Collision Detection for VRML,"*VRML '97 Symposium*, 8 pages.
Cohen, Jonathan D., "I–Collide: Interactive and Exact Collision Detection System for Large–Scale Environments,"*I 3D Graphics '95*, Chapel Hill, North Carolina, 9 pages.
Ponamgi. Madhav K., et al., Incremental Algorithms for Collision Detection Between Polygonal Models, *IEEE Transactions On Visualization And Computer Graphics*, vol. 3, No. 1, Jan.–Mar. 1997, pp. 51–64.

*Primary Examiner*—Cliff N. Vo
(74) *Attorney, Agent, or Firm*—Nixon & Vanderhye P.C.

(57) ABSTRACT

Performance gains are realized by transforming less complex objects to the local space of a more complex object for collision detection against the more complex object. An inverse transformation stack may be used to efficiently enable transformation from world coordinate space to local coordinate space for collision detection. Avoiding the need to transform complex objects to world space for collision detection provides performance improvements by conserving processing resources and reducing the number of operations involved in collision detection. Advantages include: the ability to perform collision detection with animation objects, the ability to allow inheritance of motion in a complex hierarchy, and the ability to use instancing. Using the local coordinate space to perform collision detection with animated, instanced, hierarchical objects provides significant performance improvements over the world coordinates-based approach widely used in the past.

18 Claims, 24 Drawing Sheets

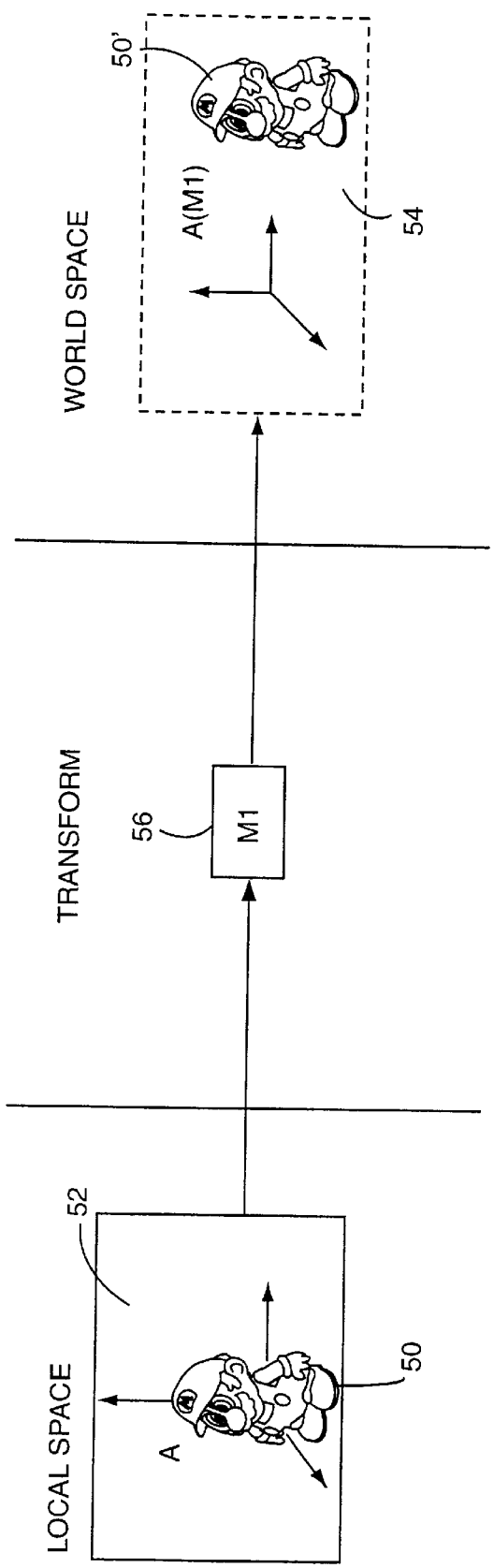

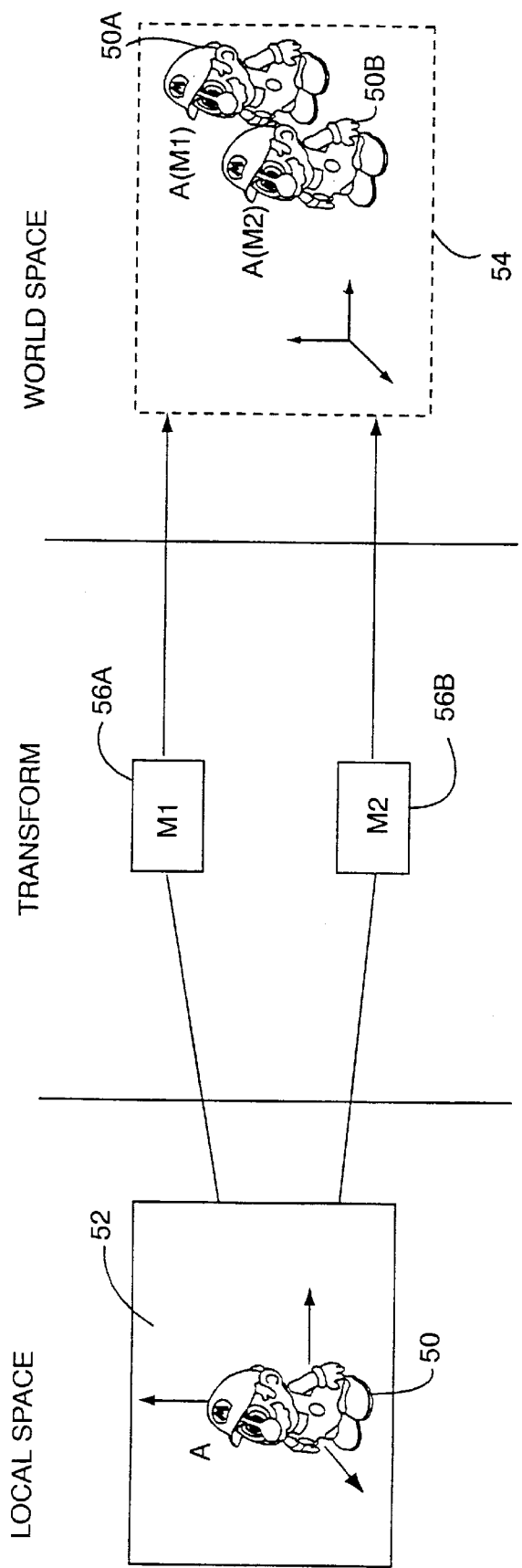
Fig. 2 *(Prior Art)*
EXAMPLE PROCESS FOR INSTANCING AN OBJECT

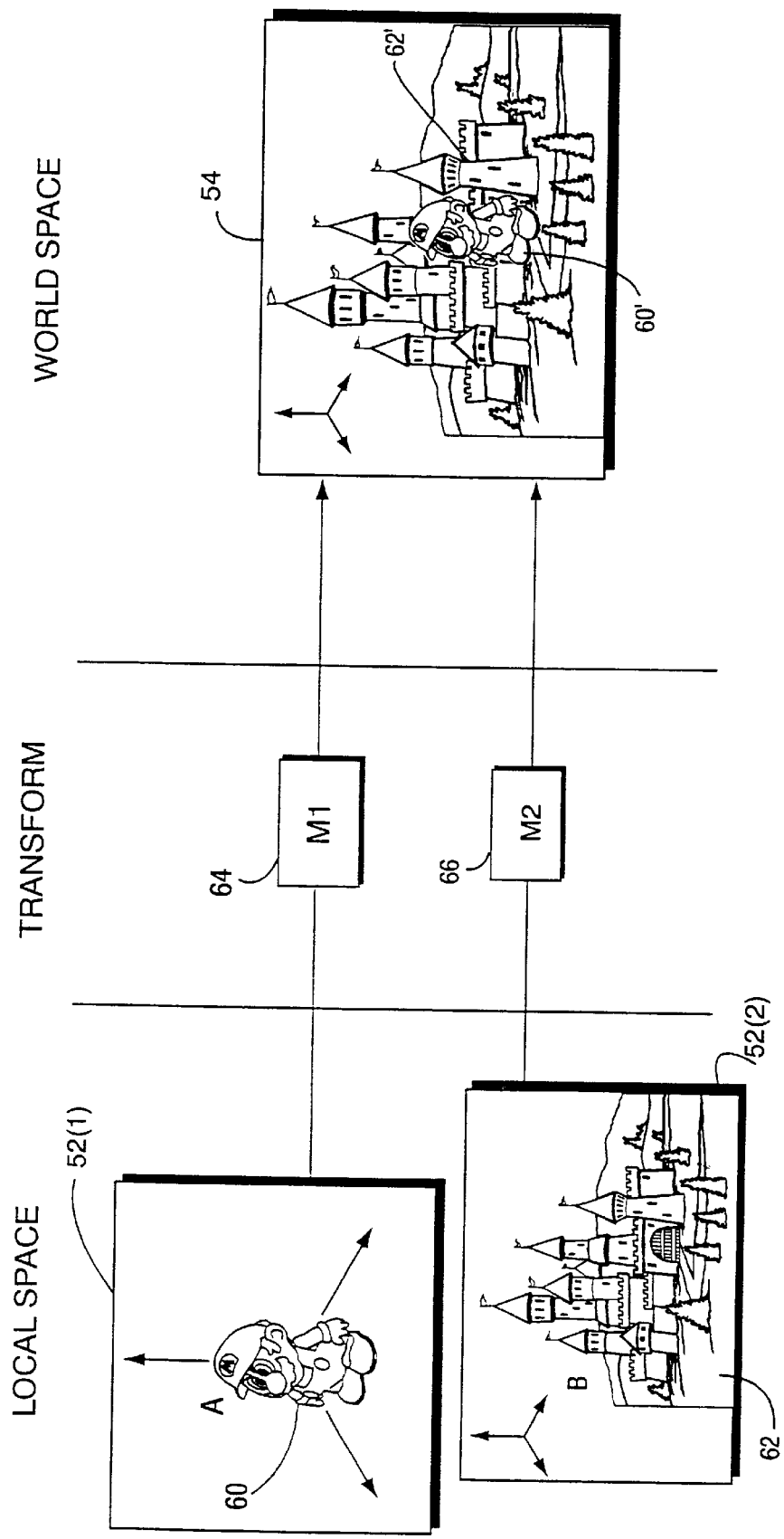
Fig. 3 *(Prior Art)*
SIMPLE OBJECT COLLIDING WITH COMPLEX OBJECT

INVERSE MATRICES

COLLISION DETECTION IN LOCAL SPACE

EXAMPLE 3D COMPUTER
GRAPHICS SYSTEM (PRIOR ART)

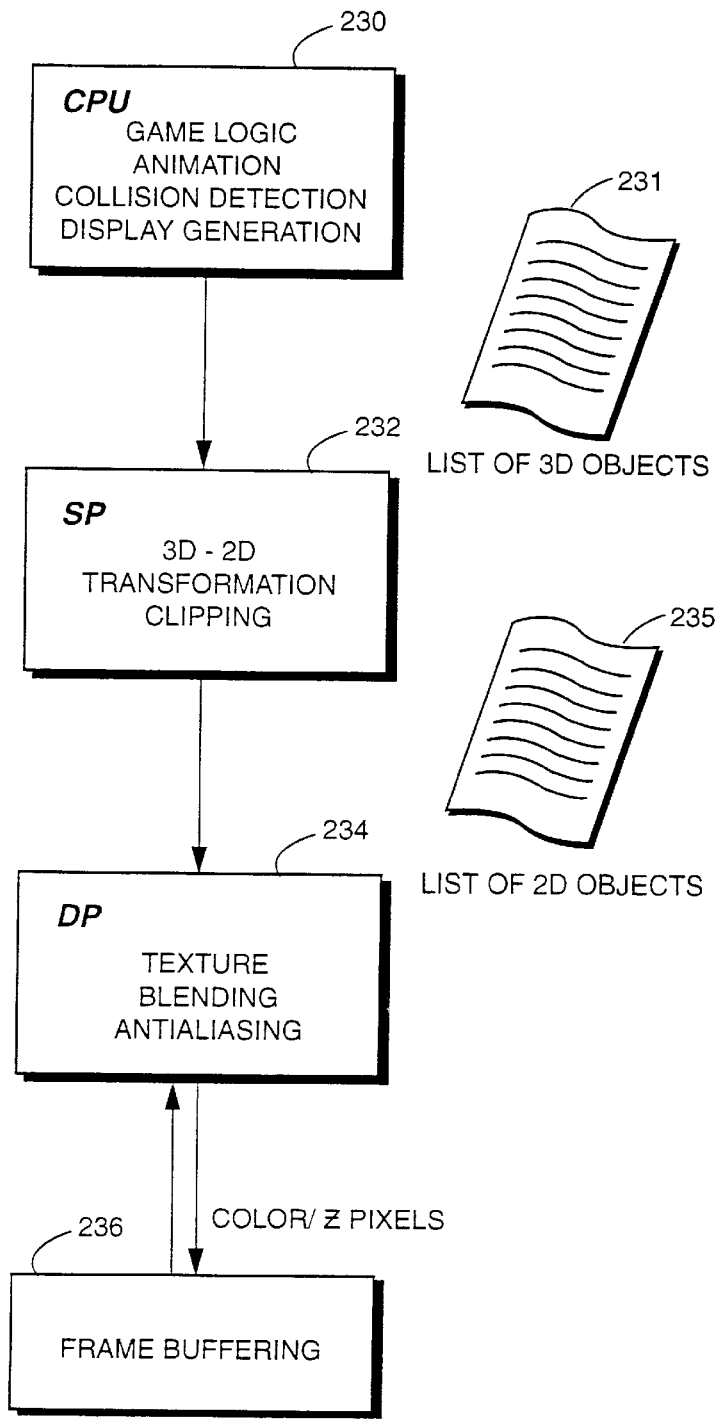
Fig. 6B *(Prior Art)*
EXAMPLE GRAPHICS PROCESSING

EXAMPLE COLLISION PROCESSING

EXAMPLE HIERARCHICAL
COORDINATE SYSTEM DATABASE

EXAMPLE COORDINATE SYSTEM DATA STRUCTURE

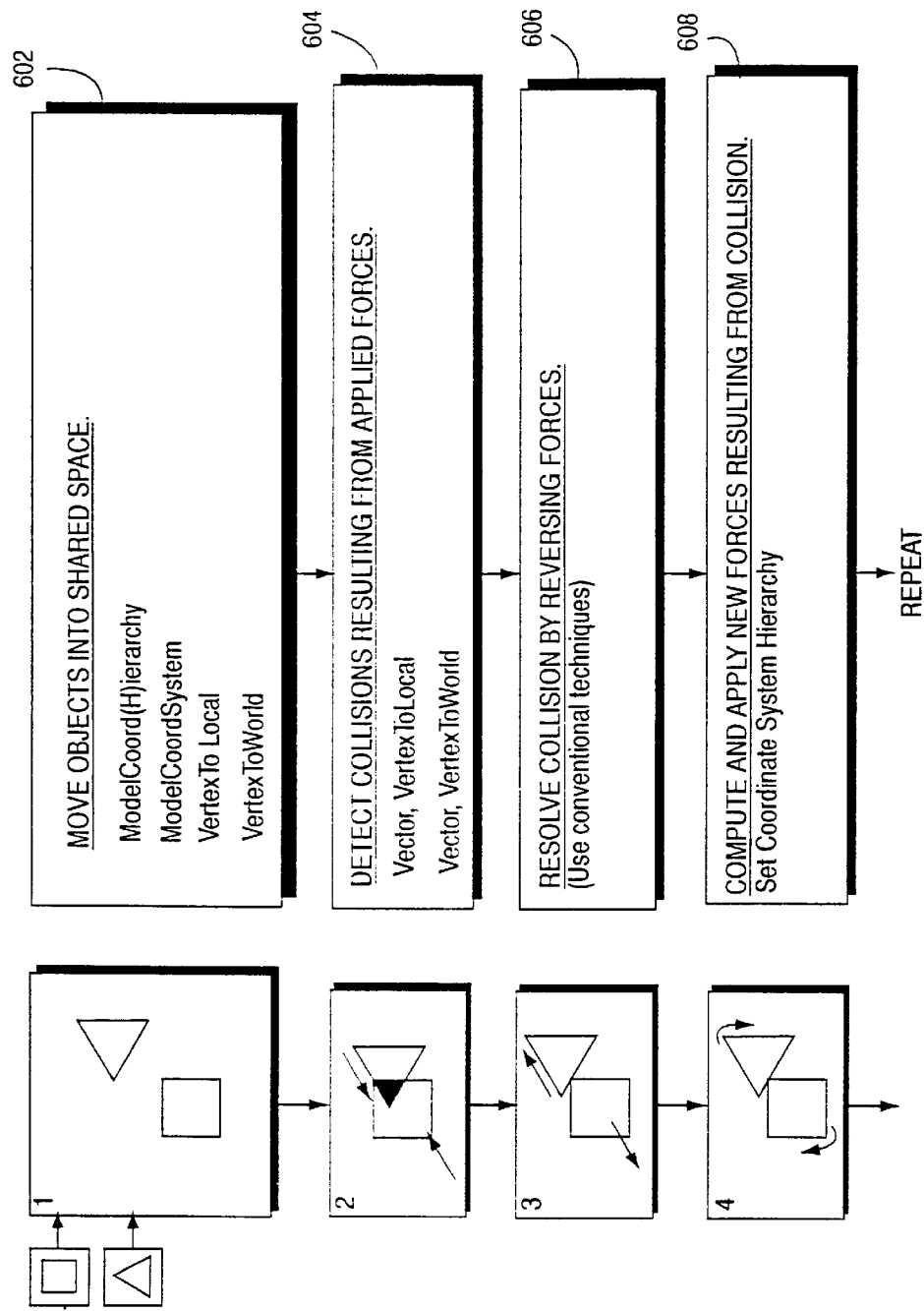
*Fig. 10* EXAMPLE USES FOR FUNCTIONS IN TYPICAL COLLISION ALGORITHM

METHOD AND APPARATUS FOR EFFICIENT ANIMATION AND COLLISION DETECTION USING LOCAL COORDINATE SYSTEMS

FIELD OF THE INVENTION

The present invention is generally related to computer graphics, and more specifically, to computer graphics collision detection. Still more specifically, the present invention relates to systems, methods and techniques for efficiently detecting collision by transforming a potentially colliding object into another object's local coordinate system.

BACKGROUND AND SUMMARY OF THE INVENTION

Importance of Collision Detection

In interactive computer graphics systems such as video games, it is often important to determine when different objects collide. For example, the video game player may operate a hand-held controller, joystick or other user input device to control the placement of a graphical character within a three-dimensional graphics "world." As the main character moves about in the imaginary world under player control, the computer graphics system must rapidly determine which terrain the character stands on, what walls he bumps into, etc. Detecting when the character collides with a part of the "world" is important to the progression of the video game and the game playing experience.

As one example, realism requires that the main character must not move through solid walls, trees or other solid objects. Also, progress of video game play often depends on collision detection. For example, in a tennis video game, collision between the tennis ball and different parts of the tennis court (e.g., the net, the rackets, etc.) determines who wins and who loses a point, and also determines where the ball goes next. In a driving game, collision of the player's car against a wall or other object may cause the car to crash or experience some other effect. In a fighting game, contact between characters may have consequences in terms of who wins the fight. Many interactive computer graphics systems have similar collision detection requirements.

Collision detection can be a very processor-intensive operation. Often, for example, a moving object such as a main character is moved under player control within a terrain or landscape of arbitrary complexity. Detecting collisions with large or irregular objects of arbitrary complexity can require lots of processing resources.

Computer Graphics Systems Often Have Limited Resources

Video games and other interactive graphics systems need to perform graphics operations in real time—often within the 1/30th or 1/60th of a second frame time of a conventional video display. This rapid response time places a premium on system processing resources. In many interactive graphics systems, there may not be enough processing resources to satisfy demand. This problem can be especially acute in relatively inexpensive, resource-constrained real time interactive graphics systems such as, for example, home video game systems.

In low cost systems, processing resources may be nearly or completely occupied generating the interactive video game or other real-time video graphics and sound display effects. Video game designers sometimes must sacrifice desirable image effects for fear of overwhelming available processing resources. Further, such systems are often resource constrained in other areas as well—for example, the amount of available storage. In such resource-constrained environments, it is desirable to maximize efficiency whenever possible to provide interesting visual effects without overloading available resources. As will be explained below, collision detection can require more resources than are available.

Collision Detection Relies on Transformations

For objects to interact, it is necessary to bring them into the same coordinate system—since otherwise, mathematical comparisons will be meaningless. Geometrical transformations allow a computer graphics system to mathematically change the position, orientation and size of objects for display or other purposes. It is well known in the computer graphics art to use geometrical transformations to efficiently manipulate graphical objects for display and other purposes. See, for example, Foley et al, *Computer Graphics: Principles and Practice* (2d Ed. Addison-Wesley 1990), Chapters 5 and 7.

One way to think about a transformation is as a change in coordinate systems. For example, each object can be defined within its own, "local" coordinate system—and transformations can be used to express the objects' coordinates within a single, global ("world") coordinate system. This is analogous to providing several pieces of paper, each with an object on it; and shrinking, stretching, rotating and/or placing the various papers as desired onto a common world-coordinate plane.

To illustrate, FIG. 1 shows an object 50 being transformed from its own "local space" coordinate system 52 into a "world space" coordinate system 54. In this simplified example, object 50 is a three-dimensional object defined within its own 3-D (x,y,z) local space coordinate system 52. Object 50 may, for example, conveniently be defined as having one of its points (e.g., a corner point or vertex) at the xyz origin of local space coordinate system 52.

A transformation matrix 56 ("M1") is used to flexibly transform the object to the purely hypothetical "world space" coordinate system 54. Transform 56 can:

move the object around within the world space coordinate system 54, rotate the object in any of three dimensions within the world space coordinate system, and/or make the object larger or smaller in any of its three dimensions within the world space coordinate system.

In the particular example shown, transform 56 displaces object 50' from the origin in the world space coordinate system 54. By changing the parameters of transform 56, it is possible to move, reorient and/or resize object 50' anywhere in world space 54. By changing the parameters of transform 56 over time, one can animate object 50' in the world space coordinate system 54.

The local space object definition shown in the left-hand side of FIG. 1 can remain constant. Only the object's parameters in local space 52 need to be represented in a stored image database. It is not necessary to maintain a separate database containing the object 50' transformed into world space 54 because the world space representation of the object 50' can be generated on demand by mathematically applying transformation matrix M1 to the stored, local space parameters. This saves storage, and also has other advantages—including the ability to perform "instancing."

Instancing is Useful

Instancing is a very useful technique for reducing the amount of data the computer graphics system must store at any given time. Instancing is especially useful in cases where it is possible to build images out of multiple "versions" of the same basic or "primitive" object(s) (for example, four identical tires on a car). One can maintain only a single representation of the object. Each displayed instance of the object can be generated using a different transformation.

The FIG. 2 example shows two different transformations 56a, 56b ("M1" and "M2") used to transform two instances 50a, 50b of the same object 50 into world space coordinate system 54. Because it is not necessary to change the actual shape of object 50, it is efficient to describe the object only once in a local space coordinate system 52, and then generate multiple instances of the object in world space coordinate system 54—generating each different instance 50a, 50b using a different respective transform 56a, 56b. The ability to describe object 50 only once and generate multiple instances of it having different world space locations, orientations and/or sizes saves data storage.

How Transformations Have Been Used for Collision Detection

Prior video game and other computer graphics systems often performed collision detection by testing for object overlap in the common "world space" coordinate system 54. FIG. 3 shows an example of this. There are two different objects 60, 62 shown in FIG. 3. Object 60 ("Mario") is defined within a local space coordinate system 52(1); and object 62 (a castle) is defined within a different local space coordinate system 52(2). A computer graphics system (e.g., a video game system) transforms each of objects 60, 62 into world space coordinate system 54, and tests for collision in the world space coordinate system.

Unfortunately, the FIG. 3 collision detection technique can be expensive in terms of processing resources. This is because it may require transformation of every point in each of the two objects 60, 62 to the world space coordinate system 54. If either object of interest (e.g., the castle object 62) has many points, the processor has a lot of operations to perform. This can reduce processor availability for other interactive operations, slow down performance, and have other bad effects.

Transformations Can Be Expensive

FIGS. 4A and 4B show examples of how object complexity directly scales the cost of transforming an object into another space. FIG. 4A shows a simple two-dimensional object (a square) with four vertices. Transforming this simple object into another space requires four operations. FIG. 4B shows a more complex two-dimensional object with eight vertices—involving eight transformation operations. These diagrams show that as an object's complexity increases, the cost of transforming it into another space increases accordingly. Three-dimensional objects can be much more complicated. An object of arbitrary complexity (e.g., a terrain) can have thousands or tens of thousands of vertices. It is very expensive from a computational standpoint to transform such objects.

For example, assume that the processor of a computer graphics system (e.g., a home video game system such as the Nintendo 64 sold by Nintendo of America, Inc.) runs at 92 MHz (92 million cycles per second), and performs five-cycle floating point multiples and three-cycle floating point additions. A single three-dimensional vertex transformation may require 63 processor cycles:

3 rows*(3 multiplies per row)=3×15=45 cycles;

and 3 rows*(2 additions per row)=9×2=18 cycles.

Assuming cycles are lost due to cache miss and requirements for the processor to do other work (e.g., game logic, animation, and display preparation), a maximum of only about fifty percent of the processor cycles may be available for collision detection. If a video game or other computer graphics application requires sixty frames of animation per second, this means the processor is able to process a maximum of twelve thousand vertices per frame:

730,000/60 Hz=12,000 vertices/frame.

For an object of arbitrary complexity, collision detection can easily exceed the processing resources available, and thus be beyond the real time capabilities of the system Real Time Collision Detection Transformations May Be Too Expensive for Low Cost Systems Because the real time transformation from local to world space coordinate systems can be processor intensive for objects of arbitrary complexity, some low cost computer graphics systems keep most or all objects in the world space coordinate system. By maintaining the object definition in world space coordinates, the graphics system avoids the need for real time transformations from local space to world space—and therefore can rapidly perform collision detection without putting undue demands on the processor. However, maintaining object definitions in the world space coordinate system can limit flexibility. For example, animating an object defined in world space coordinates is more computationally intensive than interactively transforming the object from local space coordinates. In addition, requiring all objects to be maintained in world space coordinates for collision detection limits the use of instancing—dramatically increasing data storage requirements.

The Present Invention Solves These Problems

The present invention overcomes these problems by performing collision detection in the local coordinate space of one of the colliding objects—eliminating the need to transform the points of one of the objects before performing collision detection.

In more detail, one aspect of the present invention involves maintaining an inverse transform for objects to be displayed. An inverse transformation stack may be used to efficiently enable transformation from world coordinate space to local coordinate space. Performance gains are realized by transforming less complex objects to the local space of a more complex object for collision detection against the more complex object.

Avoiding the need to transform complex objects to world space for collision detection provides performance improvements by conserving processing resources and reducing the number of operations involved in collision detection. Advantages of the present invention include:

the ability to perform collision detection with animation objects, the ability to allow inheritance of motion in a complex hierarchy, and the ability to use instancing.

Significantly, the present invention allows efficient performance of collision detection and animation with instanced objects. For example, using the collision detection techniques provided by the present invention, it is possible to reuse geometry of any object many times without duplicating its vertex data to locate the object in the proper place.

As video developers make better 3-D video games, the amount of animation and geometric complexity will increase. Using the local coordinate space to perform collision detection with animated, instanced, hierarchical objects provides significant performance improvements over the world coordinates-based approach widely used in the past.

BRIEF DESCRIPTION OF THE DRAWINGS

These and other features and advantages will be better and more completely understood by referring to the following detailed description of presently preferred example embodiments in conjunction with drawings, of which:

FIG. 1 shows an example process in which an object is transformed from local space to world space;

FIG. 2 shows an example of an object being instanced into world space;

FIG. 3 shows an example of how different objects are transformed into world coordinate space so they can interact with one another;

FIG. 6B shows example display processing performed by different components of the FIG. 6A system;

FIGS. 9A–9L show example functions; and

FIG. 10 shows example steps performed by a presently preferred example embodiment in accordance with this invention to detect and resolve collisions.

DETAILED DESCRIPTION OF A PRESENTLY PREFERRED EXAMPLE EMBODIMENT

Figure 4A:
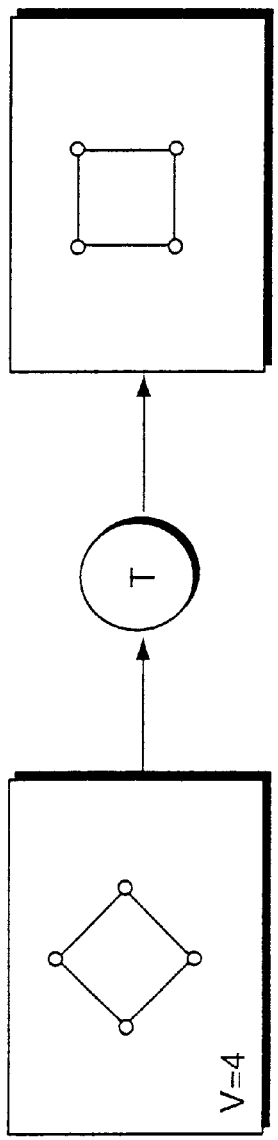
FIGS. 4A and 4B show an example of how object complexity directly scales the cost of transforming it into another space.
Figure 4B:
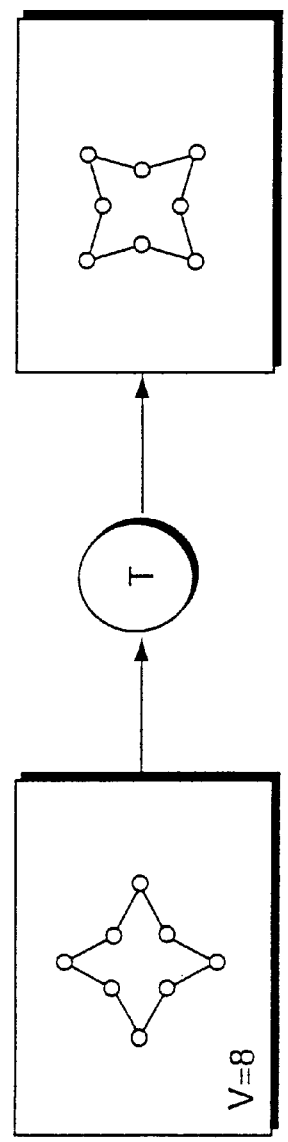
Figure 5A:
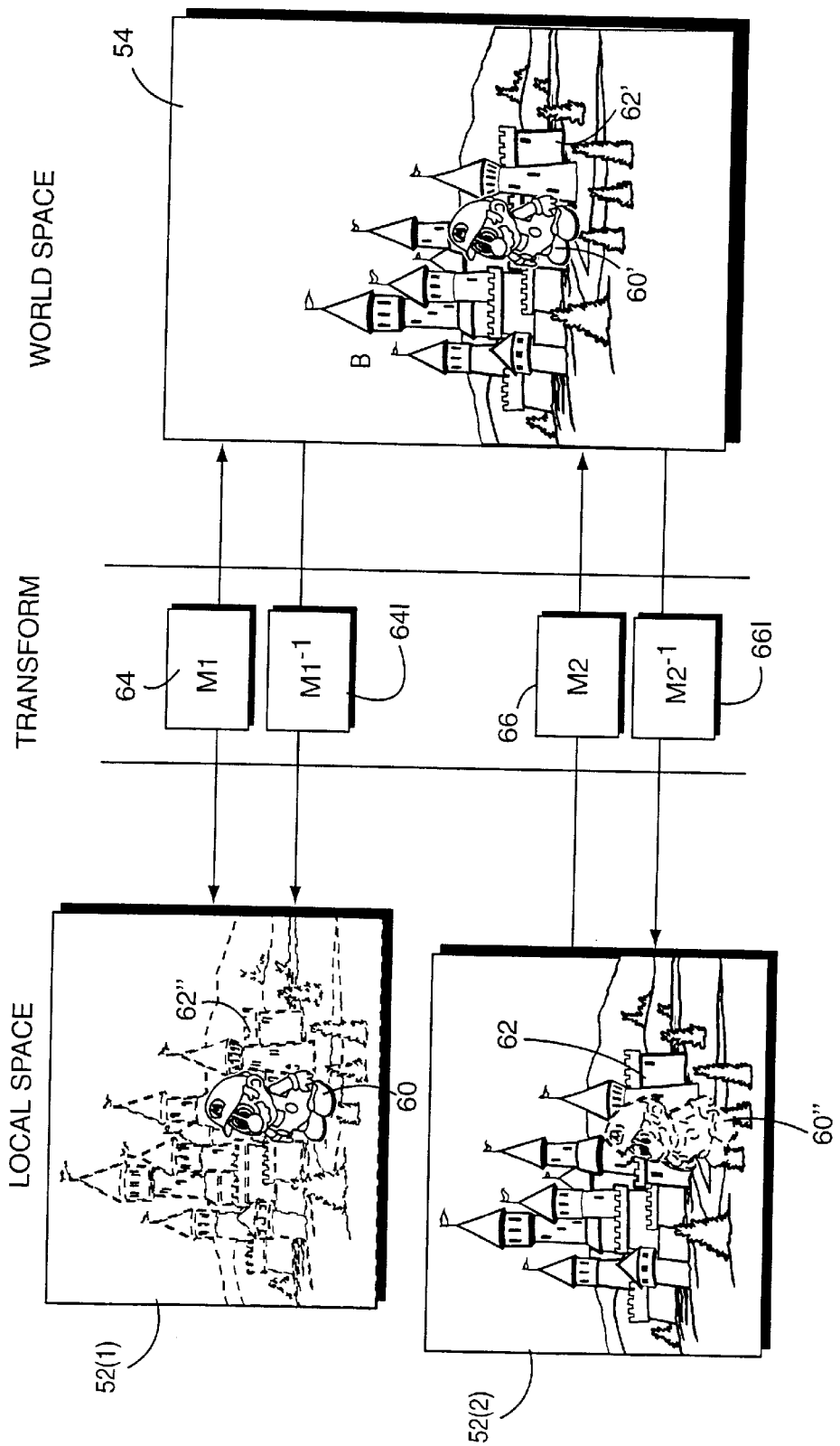
FIG. 5A shows how inverse transforms may be used to transform an object into another object's local space.

FIG. 5A shows example collision detection in accordance with a presently preferred example embodiment of this invention. In the FIG. 5A simplified example, an inverse transform is maintained for each direct transform from local space to world space. The inverse transform allows the object to be transformed from world space to local space. By maintaining these inverse transforms, it is possible to efficiently transform one object into the local space coordinate system of another object for collision detection purposes. Using the inverse transforms, it is possible to perform collision detection in the local space coordinate system of either colliding object.

For example, in addition to maintaining a direct transform 64 (M1) for transforming object 60 from its local space coordinate system 52(1) to the world space coordinate system 54, the preferred embodiment also maintains an inverse transform 64i (M1-1). Inverse transform 64i performs the inverse or opposite operation of direct transform 64—that is, it allows object 60' as defined in world space coordinate system 54 to be transformed back into object 60 defined within the local space coordinate system 52(1). Similarly, an inverse transform 66i (M2-1) may be maintained to transform object 62' from world space coordinate system 54 back to local space coordinate system 52(2).

In this example, object 60 transformed by direct transform 64 into world space coordinate system 54 may be further transformed using inverse transform 66i into the local space coordinate system 52(2) associated with another object 62. Similarly, object 62 transformed into object 62' within world space coordinate system 54 maybe transformed by inverse transform 64i into the local space coordinate system 52(1) associated with the other object 60.

Figure 5B:
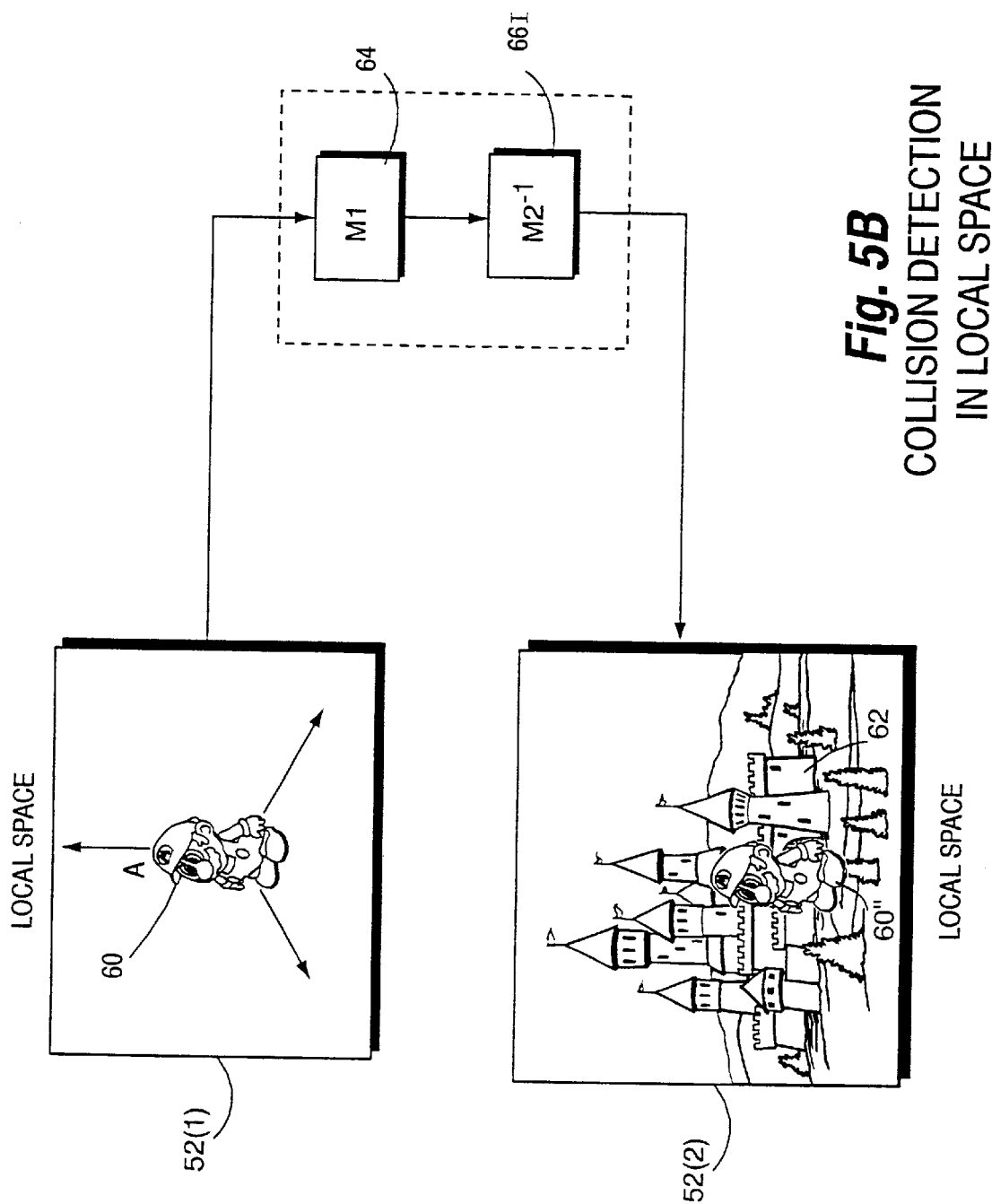
FIG. 5B shows how direct and inverse matrices together can be used to efficiently transform an object into another object's local space.

FIG. 5B shows how greater efficiencies can be achieved by transforming object 60 into the local space coordinate system 52(2) of another object 62 and performing collision detection in that local space coordinate system. FIG. 5B illustrates that the "forward" transform matrix 64 (M1) for transforming object 60 from its own local space coordinate system 52(1) into the world space coordinate system 54 can be efficiently, mathematically combined with inverse transform matrix 66i (M2-1) associated with the transformation of the other object to provide a single, efficient overall transform operation for transforming one object 60 "directly" into the local space coordinate system 52(2) associated with another object 62. As illustrated in this simple example, it is less expensive from a processing standpoint to transform a less complex object 60 into the local space coordinate system 52(2) associated with a more complex object 62 than it would be to transform the more complex object into another coordinate system. Thus, the operation shown in FIG. 5B requires fewer operations and processing resources than would be required to transform each of objects 60, 62 into world space coordinate system 54 for collision detection.

Example More Detailed Implemtation

Figure 6A:
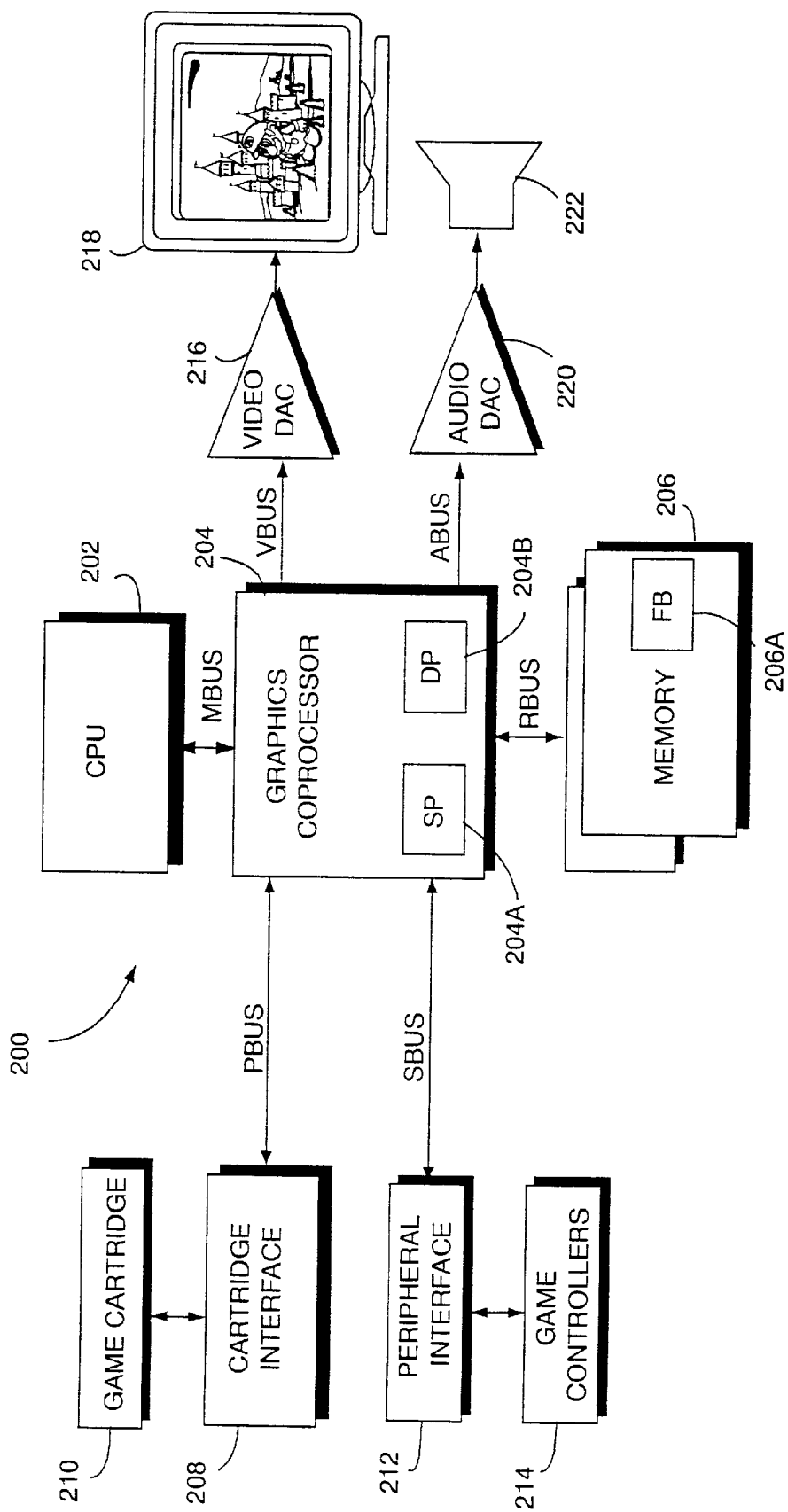
FIG. 6A shows an example computer graphics system architecture.

FIG. 6A shows a simplified example diagram of an interactive computer graphics system 200 the present invention may be advantageously used in connection with. As one example, the interactive computer graphic system 200 may be the Nintendo 64 product sold by Nintendo, and described in U.S. patent application Ser. No. 08/561,718 of Van Hook et al., filed Nov. 22, 1995, entitled "High Performance Low Cost Video Game System with Coprocessor Providing High Speed Efficient 3D Graphics and Digital Audio Signal Processing".

In this example, system 200 includes a central processor unit 202; a graphics coprocessor 204 including a signal processor 204A and a display processor 204B; memory 206; a cartridge interface 208 coupled to a game cartridge (or other game storage medium) 210; a peripheral interface 212 coupled to user inputs such as game controllers 214; a video digital to analog converter 216 coupled to a visual display 218; and an audio digital to analog converter 220 coupled to a loudspeaker 222.

FIG. 6B generally shows how graphics are processed on the FIG. 6A system. In this example, the central processing unit 202 performs game logic, animation, collision detection and display generation functions (block 230), providing a 3D object list 231. The signal processor 204a within coprocessor 204 performs three-dimensional to two-dimensional (view plane) transformation and clipping operations (block 232), providing a 2D object list 235. Display processor 204b performs texturing, blending and anti-aliasing (rasterization) (block 234). Frame buffer 206a performs frame color and depth buffering (block 236) storing images for display on display 218.

In this example system 200, coprocessor 204 is substantially continually occupied generating graphics and audio outputs. Furthermore, coprocessor 204 is continually transforming 3D graphics objects for display processing purposes, but does so at high speed without performing collision detection (or, in general, providing intermediate transformation results to processor 204 to allow the processor to make use of them in collision detection functions).

Accordingly, in this particular system, collision detection is performed by processor 202 independently of any display-related transformations coprocessor 204 performs. Processor 202 also has many other tasks to perform (e.g., input handling, game logic, animation and other tasks). Therefore, processor 202 is incapable of doing a significant amount of vertex transformation for collision detection purposes, and collision detection must be made as efficient as possible.

Figure 7:
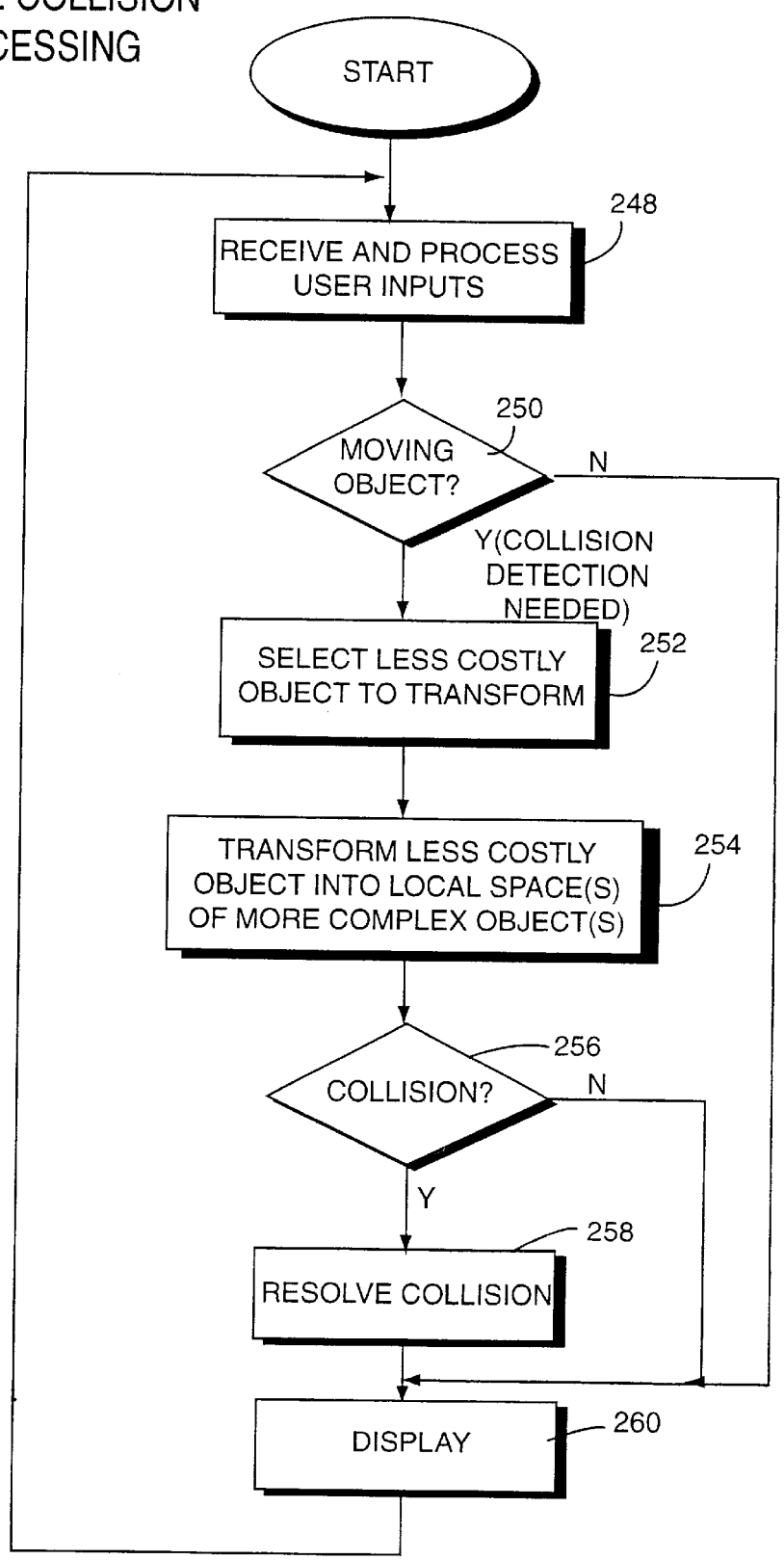
FIG. 7 shows example collision processing in accordance with the present invention.

FIG. 7 shows a simplified example overall video game processing including collision detection performed by processor 202. Instructions defining the FIG. 7 video game processing can be stored on game cartridge 210 shown in FIG. 6A. In this example, processor 202 may determine, in the course of video game play, whether there is an opportunity for collision (e.g., whether one object is moving relative to another (FIG. 7, block 250). If there is an opportunity for collision, then processor 202 may determine which object is less complex (i.e., has fewer vertices) and is thus less costly to transform (FIG. 7, block 252). Processor 202 may then transform the less costly object into the local coordinate space(s) of the more complex object(s) using the less costly objects direct transformation matrix into world space and the more costly object's inverse transformation matrix (FIG. 7, block 254; see FIG. 5B).

Processor 202 may then test for collision in the more complex object's local coordinate system—avoiding the processing cost of transforming the more complex object (FIG. 7, block 256). If processor 202 detects a collision ("y" exit to decision block 256), it resolves the collision using known techniques (FIG. 7, block 258).

Example More Detailed Implementation

Figure 8A:
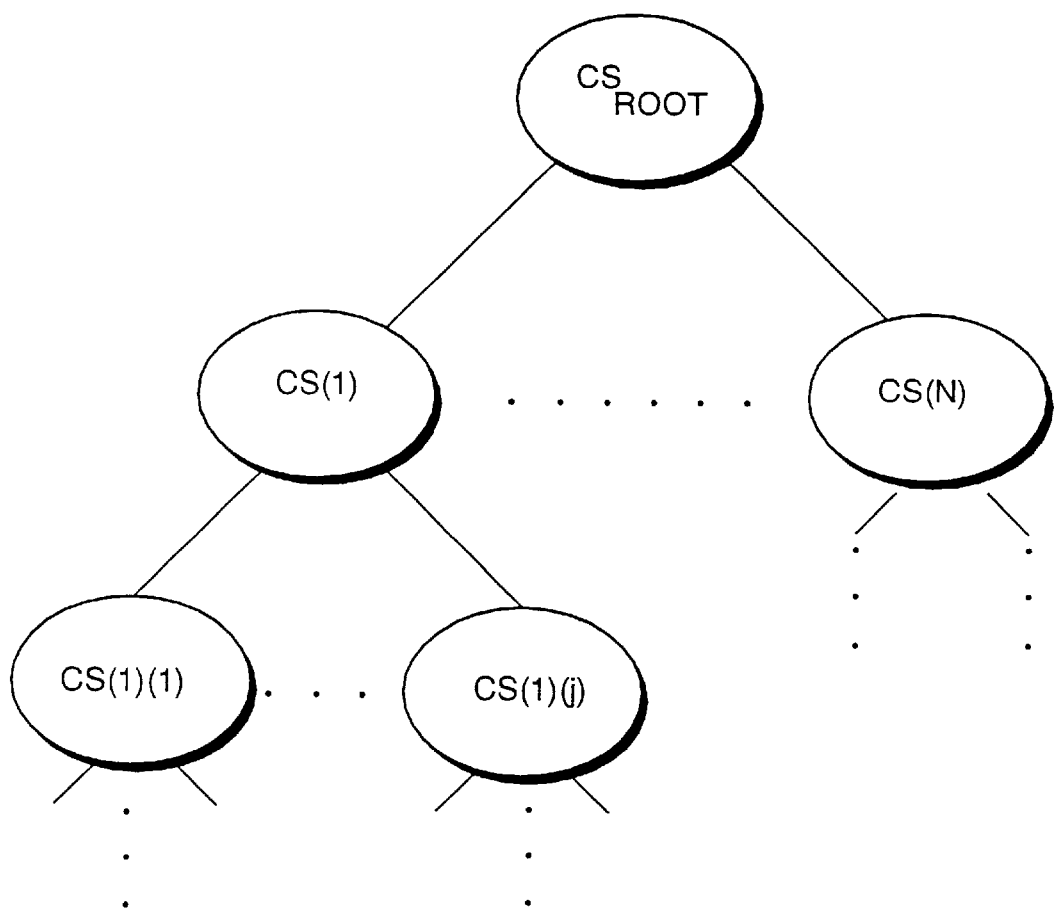
FIGS. 8A and 8B show an example hierarchical coordinate system database.

FIG. 8A shows an example hierarchical graphics database providing a hierarchical tree structure of coordinate systems CS. The FIG. 8A database may be stored or defined by information within the FIG. 6A game cartridge 210. The FIG. 8A hierarchical database can have any number of levels, each level having any number of coordinate systems. A root coordinate system CS OF ROOT may have any number of "child" coordinate systems CS(1) . . . CS(N) associated with it. Each "child" coordinate system CS(1) . . . CS(N) may, in turn, have any number of its own children coordinate systems (e.g., CS(1)(1), . . . CS(1)(J)).

Figure 8B:
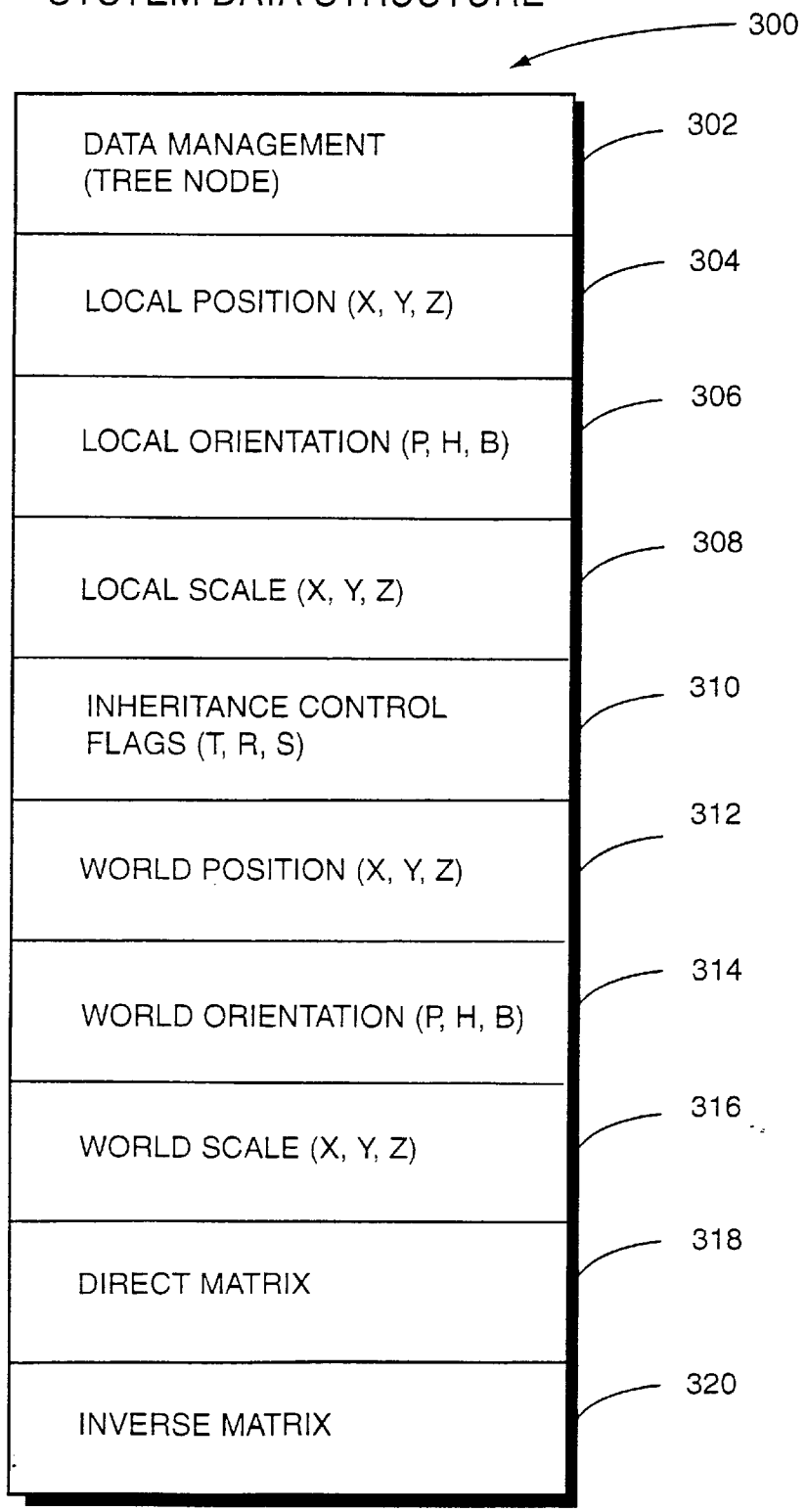

FIG. 8B shows an example coordinate system data structure 300 that may exist at each "node" of the FIG. 8A hierarchical tree structure. In this example, each coordinate system data structure 300 may include the following elements:

a data management component 302;

a local coordinate system position component 304;

a local coordinate system orientation component 306;

a local coordinate system scale component 308;

inheritance control flags 310;

a world coordinate system position component 312;

a world coordinate system orientation component 314;

a world coordinate system scale component 316;

a direct transformation matrix 318; and an inverse transformation matrix 320.

The following is a corresponding compact "pseudo code" example description of the FIG. 8B data structure 300:

"Mechanism for modeling a local coordinate system"
OBJECT DESCRIPTION: Coordinate System
{
"Components for data management"

Tree Node

"Components for high level control"
Local Translation (X, Y, Z)
Local Rotation (Pitch, Head, Bank)
Local Scale (X, Y, Z)
Inheritance Control Flags (Translation, Rotation, Scale)

"Components for high level evaluation"
World Location (X, Y, Z)
World Rotation (Pitch, Head, Bank)
World Scale (X, Y, Z)

"Components for fast transformation of input coordinates"
Direct Matrix
Inverse Matrix
}

In this example, data management component 302 is used to maintain the coordinate system in a hierarchical, branching database such as is shown in FIG. 8A. Such a database might be used to model direct kinematics for positioning an articulated model made up of many coordinate systems, for example.

The local position, orientation, scale and inheritance control flags components 304, 306, 308, 310 are all used as high level inputs for a programmer. Because the coordinate system is a mechanism intended for use by a programmer, the preferred implementation includes components that allow a more intuitive interface to this mechanism. Thus, the position, orientation and scale of the associated object represented by coordinate system 300 is described by the high level control components 304–310. The programmer may describe the position, orientation and scale of the object independently by placing coordinates, degrees or ratios into components 304, 306, 308, respectively.

In a hierarchical database such as shown in FIG. 8A, the programmer may decide what attributes a coordinate system should inherit from its parent system by manipulating the inheritance flags 310. This feature may be used, for example, in a video game where the character rides on a moving, rotating and/or scaling platform. As the programmer would wish the character to move with the platform, but not rotate or scale, the inheritance of both rotation and scaling may be turned off at the programmer's option.

In a hierarchical database, the actual position, orientation and/or scale of a coordinate system in world space may be different from the local position, orientation and/or scale. This is because additional offsets may be inherited from the coordinate system's parent. For example, if a programmer defines a coordinate system "A" with the local position of (10, 20, 30), and places inside of it another coordinate system "B" with a local position of (40, 50, 60), the world position of "A" will be (10, 20, 30), but the world position of "B" will be (50, 70, 90) because of its local position relative to the world position of "A." To make it easier for programmers to find the actual world space position, orientation and scale of a coordinate system, the preferred implementation also provides world location, world orientation and world scale components, 312, 314, 316. These may be in the same format as the high level input components 304, 306, 308 discussed above.

One purpose of the coordinate system data structure 300 is to quickly transform blocks of data from one coordinate space to another. Accordingly, the preferred embodiment provides two matrices to perform the spatial transformation. For 3D implementations, these matrices are [3][3]—and for 2D, [2][2]. Transformation matrices may be used to transform vectors, vertices, other matrices, etc. The direct matrix 318 describes a transformation from the local space into world space. Inverse matrix 320 describes the opposite transformation from world space into local space. Both of these matrices take the potentially hierarchical nature of the coordinate system into account—even in a deep hierarchy, the matrices will transform properly.

The preferred embodiment also provides a set of functions used to manipulate coordinate system data structures 300 as organized into the tree structure shown in FIG. 8A. The following is a listing of example functions of the coordinate system object:

FUNCTION FORMAT: Function Name (input parameter 'name', . . . n)

"Functions of the Coordinate System Object"

| Function Name | Parameters |
| --- | --- |
| ExtractCoordSystem | (CoordSystem 'coordSystem') |
| InitCoordSystem | (CoordSystem 'coordSystem') |
| InsertCoordSystem | (CoordSystem 'parentSystem', CoordSystem 'childSystem') |
| ModelCoordHierarchy | (CoordSystem 'rootSystem') |
| ModelCoordSystem | (CoordSystem 'coordSystem') |
| RemoveCoordSystem | (CoordSystem 'coordSystem') |
| SendCoordSystemToRoot | (CoordSystem 'coordSystem') |
| SetCoordSystemSpace | (CoordSystem 'coordSystem', Vector 'translation', Vector 'rotation', Vector 'scale') |
| VectorToLocal | (CoordSystem 'coordSystem', Vector 'vector') |
| VectorToWorld | (CoordSystem 'coordSystem', Vector 'vector') |
| VertexToLocal | (CoordSystem 'coordSystem', Vertex 'vertex') |
| VertexToWorld | (CoordSystem 'coordSystem', Vertex 'vertex') |

The following are example descriptions of each of these example functions.

Example "Extract Coordinate System" Function

Figure 9A:
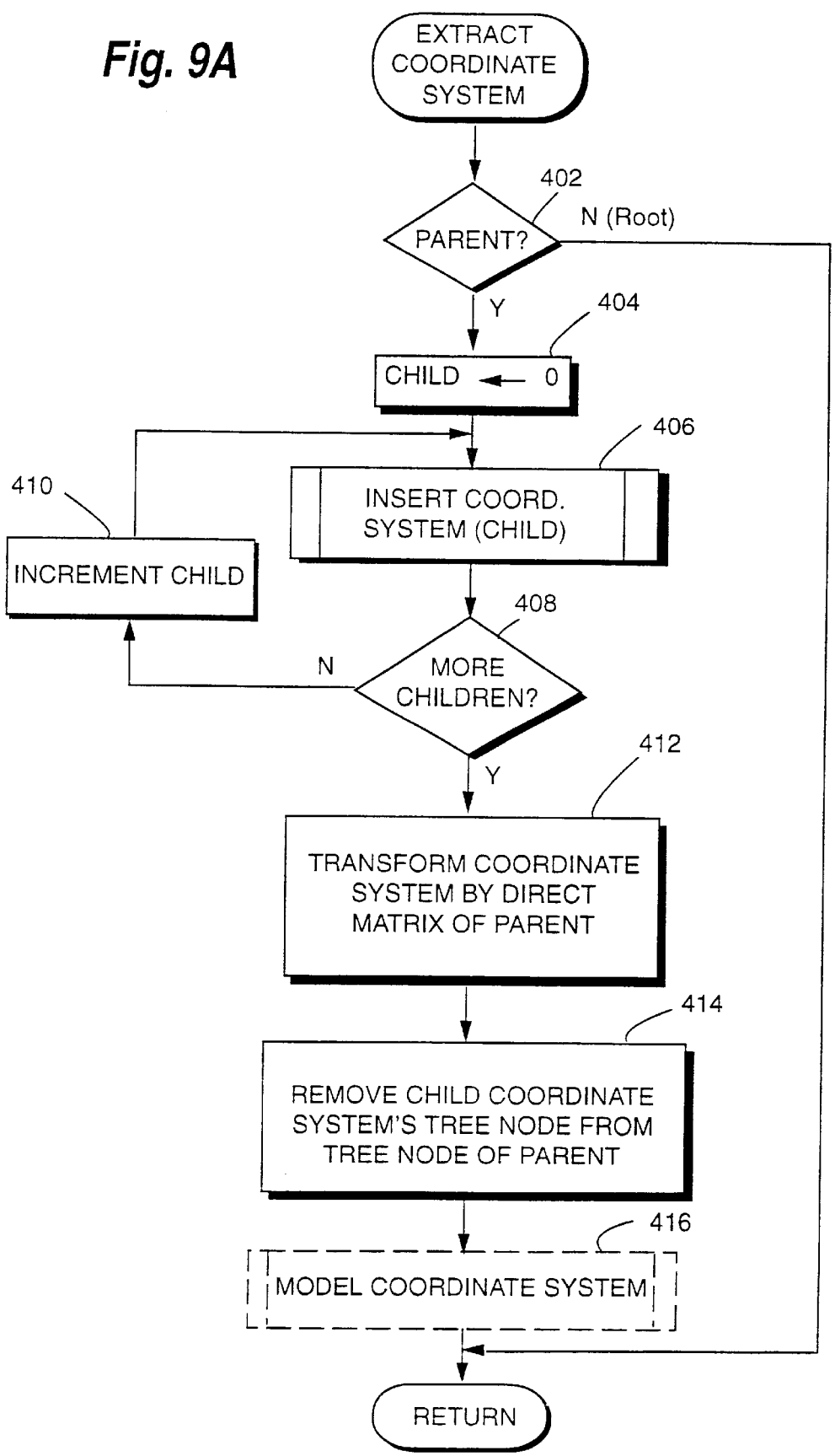

FIG. 9A shows an example "extract coordinate system" function. Example "extract coordinate system" function removes a single coordinate system from a hierarchy of coordinate systems—transforming the system back into world space. Any children of the coordinate system will be removed from that system and left in the hierarchy.

In this example, the function first tests to determine whether the coordinate system has a parent coordinate system (FIG. 9A, block 402). If it does not have a parent ("no" exit to decision block 402), the function returns because the coordinate system is a root of the hierarchy and cannot be removed.

Next, for each child of the coordinate system, the extract coordinate system function calls an "insert coordinate system" (child) function to place the corresponding child system into the parent system's coordinate space (FIG. 9A, block 406). The example function then transforms the coordinate system by the direct matrix of its parent to move it into world space (FIG. 9A, block 412), and removes the coordinate system tree node from the tree node of its parent (FIG. 9A, block 414). An additional function ("model coordinate system") may be called if an update is desired (FIG. 9A, block 416).

The following is an example pseudo code implementation for the "extract coordinate system" function:
ExtractCoordSystem
ExtractCoordSystem (CoordSystem 'coordSystem')
"A function the removes a single Coordinate System ('coordSystem') from a hierarchy of Coordinate Systems, transforming that system back into world space. Any children of the Coordinate System will be removed from that system and left in the hierarchy."

CODE:
If coordsystem's Tree Node does not have a parent ('coordSystem:Parent'):
  Return from the function; coordSystem is the root of the hierarchy and cannot be removed.

For each child of coordSystem ('coordSystem:Child[0 . . . n]'):
  Call 'InsertCoordSystem(coordSystem:Parent, coordSystem:Child[n])' to place the child system into the parent system's space.
Transform coordSystem by the Direct Matrix of its parent so as to move it into world space.
Remove coordSystem's Tree Node from the Tree Node of coordSystem:Parent.
ModelCoordSystem(coordSystem) may be called if an update is desired.
END.

Example "Initialize Coordinate System" Function

Figure 9B:
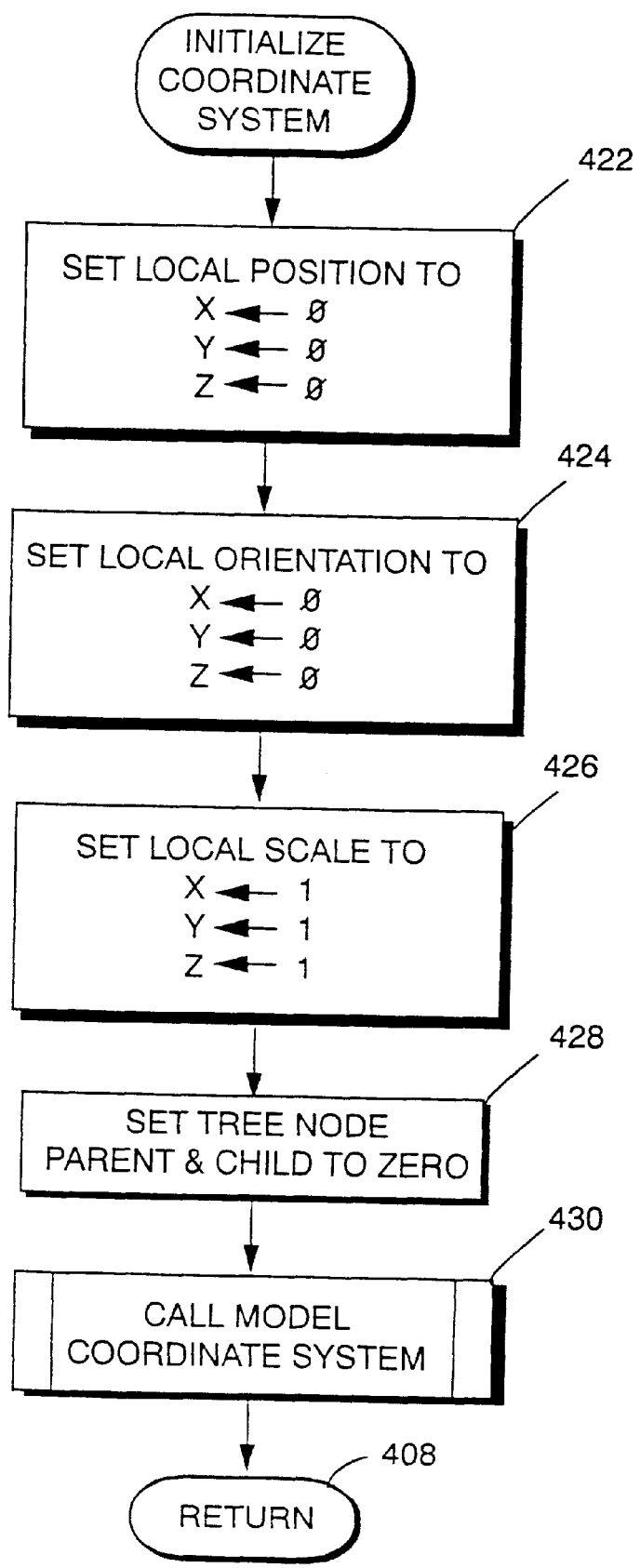

FIG. 9B shows an example flow diagram of an "initialize coordinate system" function. The example "initialize coordinate system" function initializes the internal parameters of a coordinate system data structure 300 so as to describe an identity space located at x=0, y=0, z=0, with an orientation of pitch =0, head =0, bank =0, and a scale of x=1, y=1, z=1.

In this example function, the local position component 304 is set to 0 in all dimensions (FIG. 9B, block 422) and similarly, the orientation component parameters 306 are set to 0 (FIG. 9B, block 424). Then, the local scale parameters are set to unity (FIG. 9B, block 426). In this example, the initialize coordinate system function may then set the coordinate system's tree node parent and child to 0 (FIG. 9B, block 428), and then may call an example model coordinate system function to produce the relevant matrices and evaluation components (FIG. 9B, block 430).

The following is an example pseudo code description:
InitCoordSystem InitCoordSystem (CoordSystem 'coordSystem')
"A function that initialized the internal parameters of a Coordinate System ('coordSystem') so as to describe an identity space located at (0 X, 0 Y, 0 Z), with an orientation of (0 Pitch, 0 Head, 0 Bank), and a scale of (1 X, 1 Y, 1 Z)."

CODE:
Set coordSystem's local position to equal (0 X, 0 Y, 0 Z).

Set coordsystem's local orientation to equal (0 X, 0 Y, 0 Z).
Set coordSystem's local scale to equal (1 X, 1 Y, 1 Z).
Set coordSystem's Tree Node's parent and children to 0.
Call ModelCoordSystem(coordSystem) to produce the relevant matrices and evaluation components.
END.

Example "Insert Coordinate System" Function

Figure 9C:
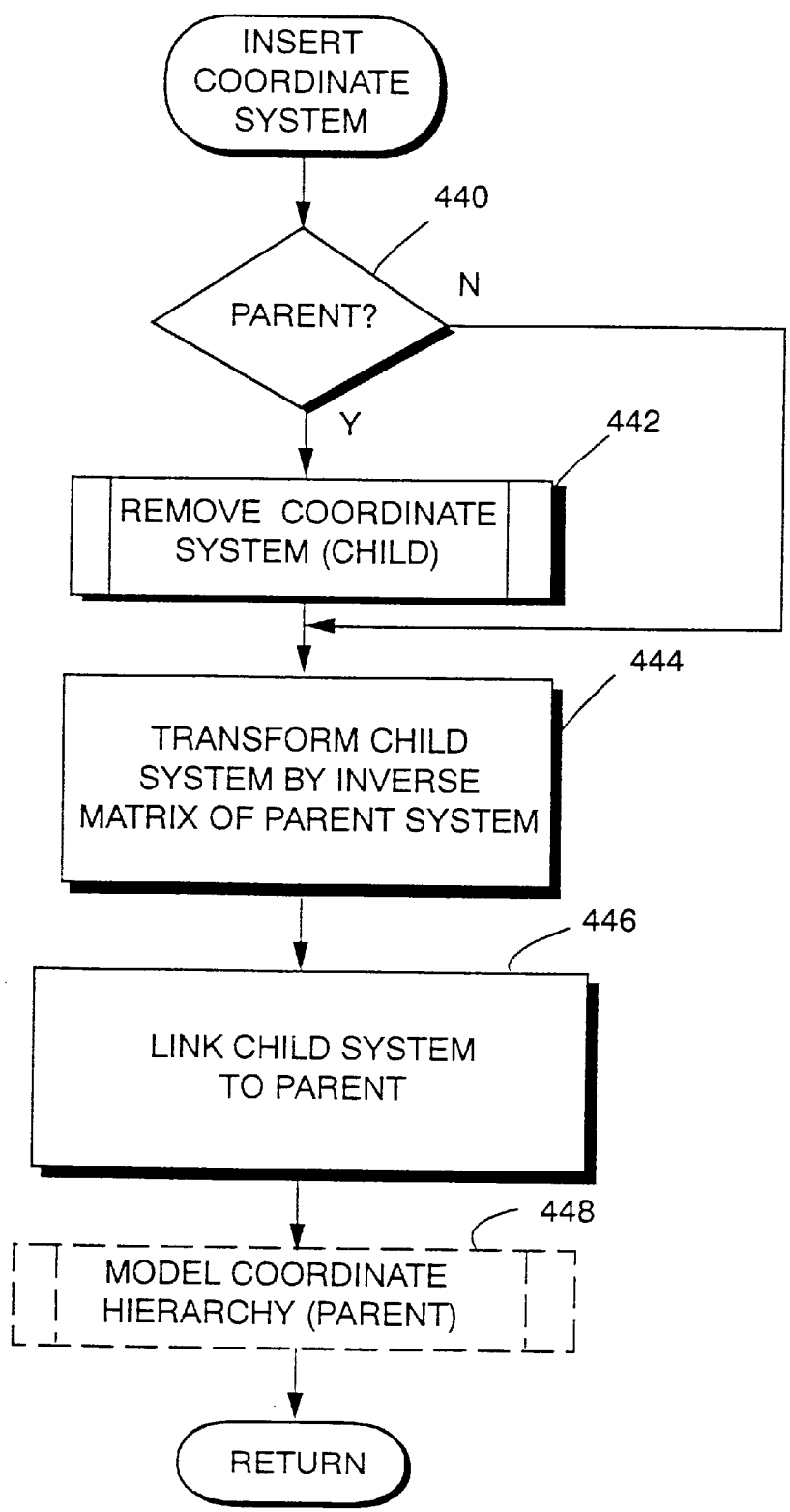

FIG. 9C shows example program control steps for performing an example "insert coordinate system" function.

This "insert coordinate system" example function places a coordinate system and any of its children into the space of another coordinate system so that any transformations of the parent will affect the child.

Referring to FIG. 9C, the example function determines whether the coordinate system already has a parent (FIG. 9C, block 440). If it does ("yes" exit to decision block 440), the example function detaches the coordinate system from its parent and returns it to world space by calling an example "remove coordinate system" function (FIG. 9C, block 442).

The example function then transforms the coordinate system by the inverse matrix of its parent so as to move it into local coordinate space (FIG. 9C, block 444). In this example, the function also joins the coordinate system's tree node 302 to its parent system—thereby "training" it as a child (FIG. 9C, block 446). The "model coordinate hierarchy" function may be called if an update is desired (FIG. 9C, block 448).

The following is an example pseudo code implementation:

InsertCoordSystem
InsertCoordSystem (CoordSystem 'parentSystem', CoordSystem 'childSystem)
"A function that places a Coordinate System ('childSystem'), and any its children, into the space of another Coordinate System ('parentSystem') so that any transformations of the parent will affect the child."
CODE:
If childSystem's Tree Node has a parent ('childSystem:Parent'):
    Call RemoveCoordSystem(childSystem) to detach coordSystem from its parent and return it to world space.
Transform childSystem by the Inverse Matrix of parentSystem so as to move it into local space.
Join childSystem's Tree Node to parentSystem's Trained as a child.
ModelCoordHierarchy(parentSystem) may be called if an update is desired.
END.

Example "Model Coordinate Hierarchy" Function

Figure 9D:
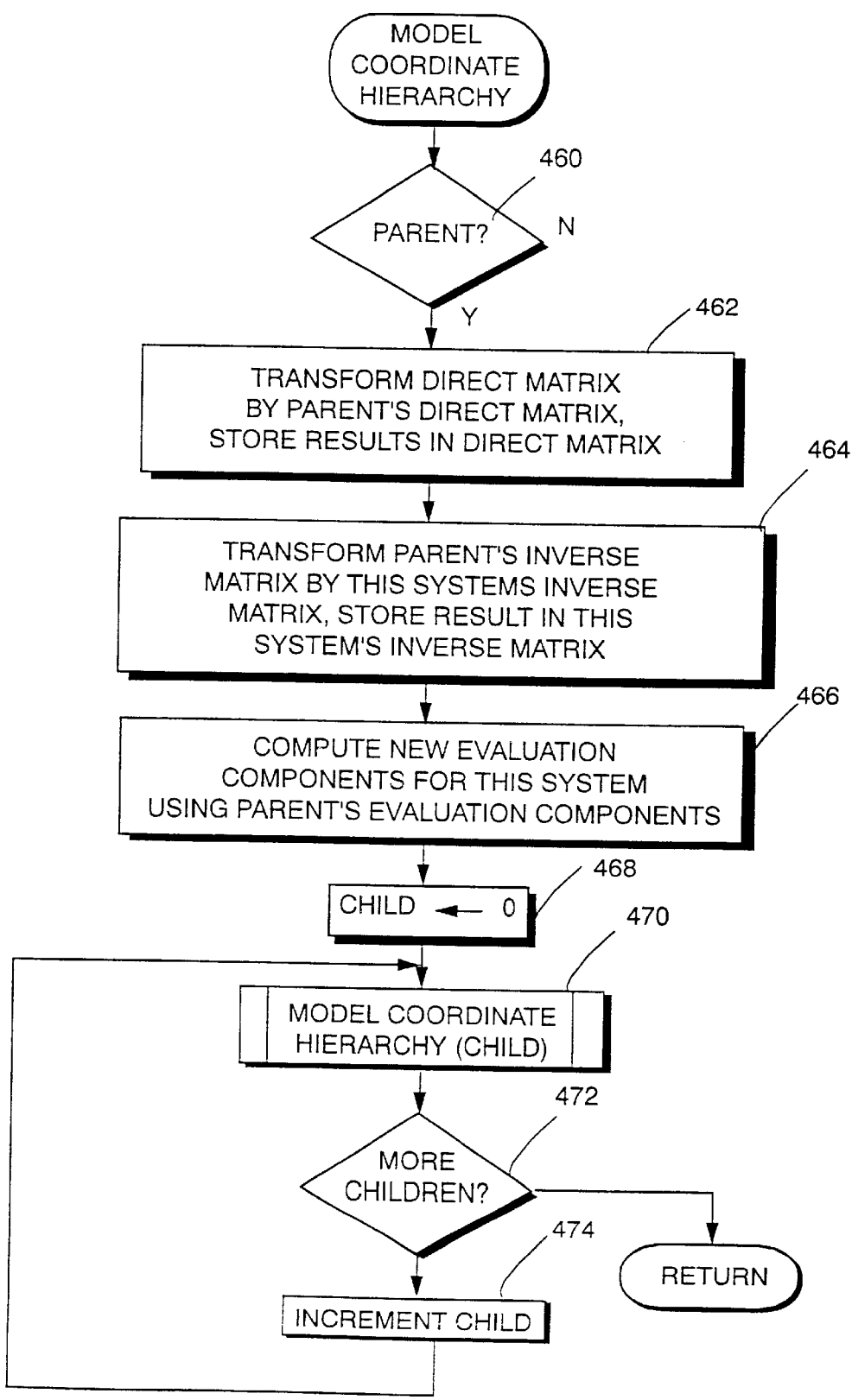

FIG. 9D shows an example "model coordinate hierarchy" function. In this example, the "model coordinate hierarchy" function uses a specified coordinate system as an entry point (root of a branching hierarchy), and moves recursively through that hierarchy—computing the evaluation components and transformation matrices for each coordinate system in the hierarchy in such a manner as to cause each coordinate system to inherit transformations of all systems above it.

In this example, the function first determines whether the specified coordinate system has a parent (FIG. 9D, decision block 460). If it has a parent ("yes" to decision block 460), the function transforms the coordinate system's direct matrix 318 by the parent coordinate system's direct matrix, and stores the result in the specified coordinate system's direct matrix (FIG. 9D, block 462).

The example function next transforms the parent coordinate system's inverse matrix 320 by the specified coordinate system's inverse matrix—and stores the result in the specified coordinate system's inverse matrix 320 (FIG. 9D, block 464). Finally, the function computes new evaluation components (see FIG. 8B) using the evaluation components of the parent coordinate system (FIG. 9D, block 466).

The example function then recursively calls itself for each child coordinate system of the specified coordinate system (FIG. 9D, blocks 468–474).

The following is an example pseudo code implementation:

ModelCoordHierarchy
ModelCoordHierarchy (CoordSystem 'rootSystem')
"A function that used a Coordinate System ('rootSystem') as the entry point, or 'root', of a branching hierarchy, and moves recursively through that hierarchy, computing the evaluation components and transformation matrices for each Coordinate System in the hierarchy in such a manner as to cause each Coordinate System to inherit the transformations of all systems above it."

CODE:
Call ModelCoordSystem(rootSystem) to update rootsystem's matrices.

If rootsystem's Tree Node has a parent ('rootSystem:Parent'):
    Transform rootSystem's Direct Matrix by rootSystem:Parent's Direct Matrix and store the result in rootSystem's Direct Matrix.
    Transform rootSystem:Parent's Inverse Matrix by rootsystem's Inverse Matrix and store the result in rootsystem's Inverse Matrix.
    Compute the new evaluation components for rootSystem using the evaluation components of rootSystem: Parent.

For each child of rootsystem ('rootSystem:Child[0 . . . n]'):
    Call 'ModelCoordHierarchy(rootSystem:Child[n])' to continue recursively.
END.

Example "Model Coordinate System" Function

Figure 9E:
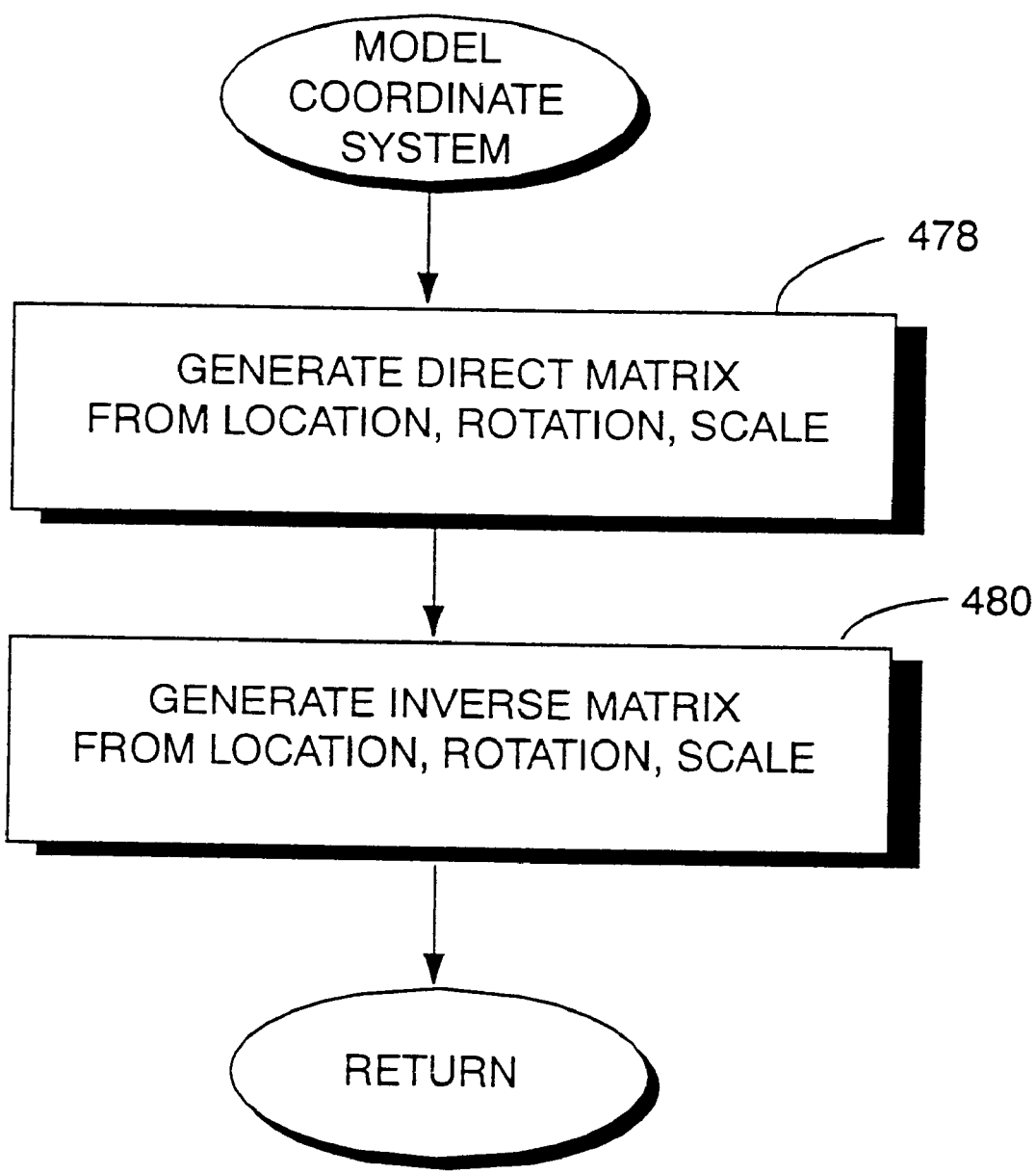

FIG. 9E shows an example model coordinate system function. The "model coordinate system" function in this example inverts the control components of a coordinate system into a matrix describing transformation from local space into world space, and a matrix describing transformation from world space into local space (i.e., the direct matrix 318 and inverse matrix 320 shown in FIG. 8B). In this example, the model coordinate system function computes the direct matrix (FIG. 9E, block 478), and then it computes the inverse matrix (FIG. 9E, block 480). Techniques for computing these matrices are well known to people of ordinary skill in the art.

The following is example pseudo code:
ModelCoordSystem
ModelCoordSystem (Coordsystem 'coordSystem')
"A function that converts the control components of a Coordinate System ('coordSystem') into a matrix describing transformation from local space into world space, and a matrix describing transformation from world space into local space. These two matrices will be stored in the Coordinate System data object for later use."
CODE:
Use coordSystem's Location, Rotation, and Scale to produce a matrix describing transformation from a local identity space into world space and store it in coordSystem's Direct Matrix.

Use coordSystem's -Location, -Rotation, and 1/Scale to produce a matrix describing transformation from world space into a local identity space and store it in coordSystem's Inverse Matrix.
END.

Example "Remove Coordinate System" Function

Figure 9F:
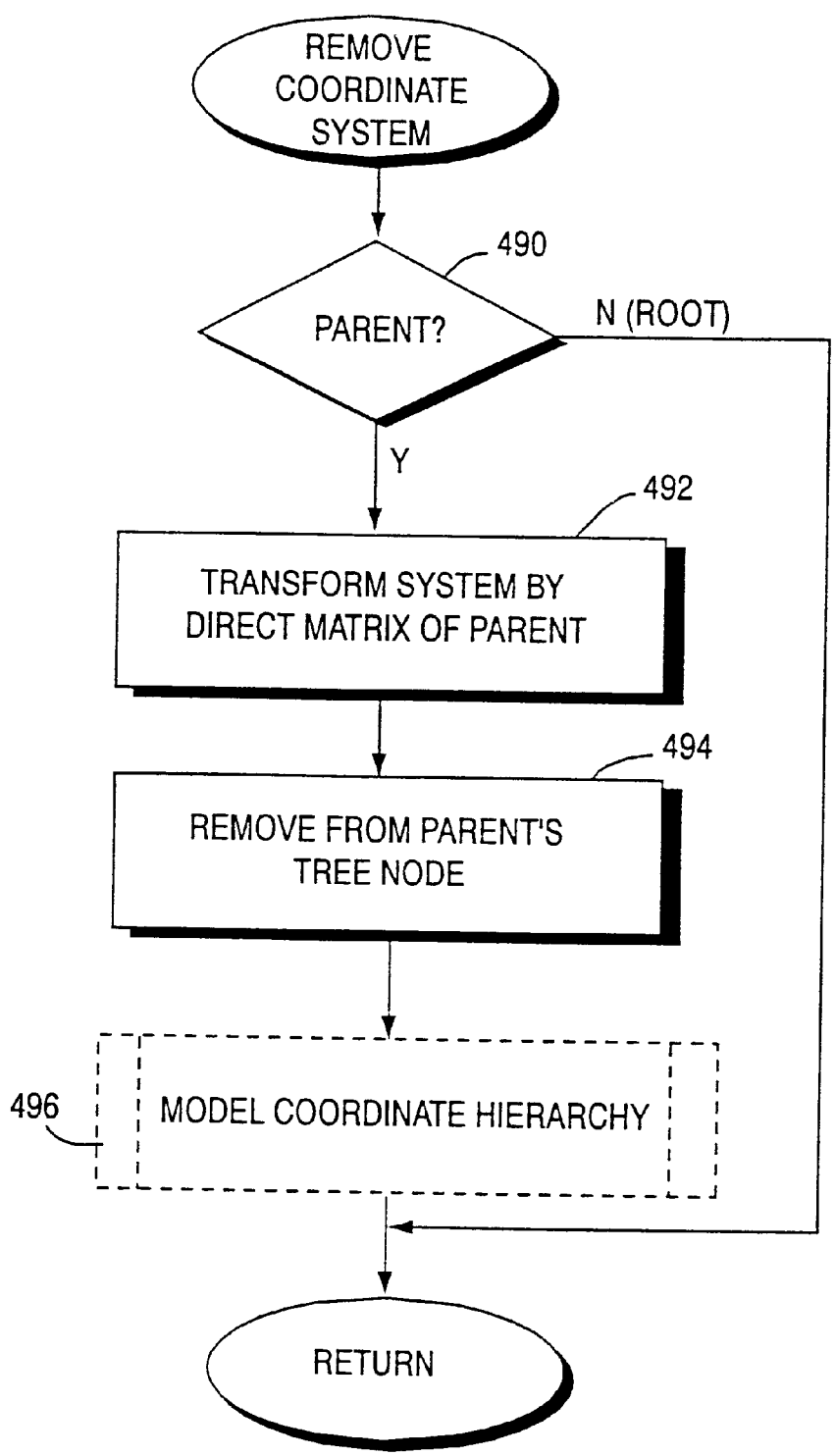

FIG. 9F shows an example "remove coordinate system" function. Remove coordinate system function in this example removes a coordinate system and its children from a hierarchy of coordinate systems—transforming that system back into world space.

In this example, any children of the coordinate system being removed, will not be removed from that system.

The remove coordinate system function in this example first determines whether the specified coordinate system does not have a parent (FIG. 9F, block 490). If the specified coordinate system has no parent, it is the root system and cannot be removed ("no" exit to decision block 490).

Assuming the specified coordinate system is not the root or the hierarchy ("yes" exit to decision block 490), the example function transforms the coordinate system using the direct matrix 318 of its parent so to move it into world space (FIG. 9F, block 492). It then removes the specified system's tree node from the tree node of its parent (FIG. 9F, block 494). The model coordinate hierarchy function may be called if an update is desired (FIG. 9F, block 496).

The following is example pseudo code:
RemoveCoordSystem
RemoveCoordSystem (CoordSystem 'coordSystem')
"A function the removes a Coordinate System ('coordSystem'), and its children, from a hierarchy of Coordinate Systems, transforming that system back into world space. Any children of the Coordinate System will not be removed from that system."
CODE:
If coordSystem's Tree Node does not have a parent ('coordSystem:Parent'): Return from the function; coordSystem is the root of the hierarchy and cannot be removed.

Transform childSystem by the Direct Matrix of coordSystem:Parent so as to move it into world space.
Remove childSystem's Tree Node from coordSystem:Parent's Tree Node.
ModelCoordHierarchy(coordSystem) may be called if an update is desired.
END.

Example "Send Coordinate System to Root" Function

Figure 9G:
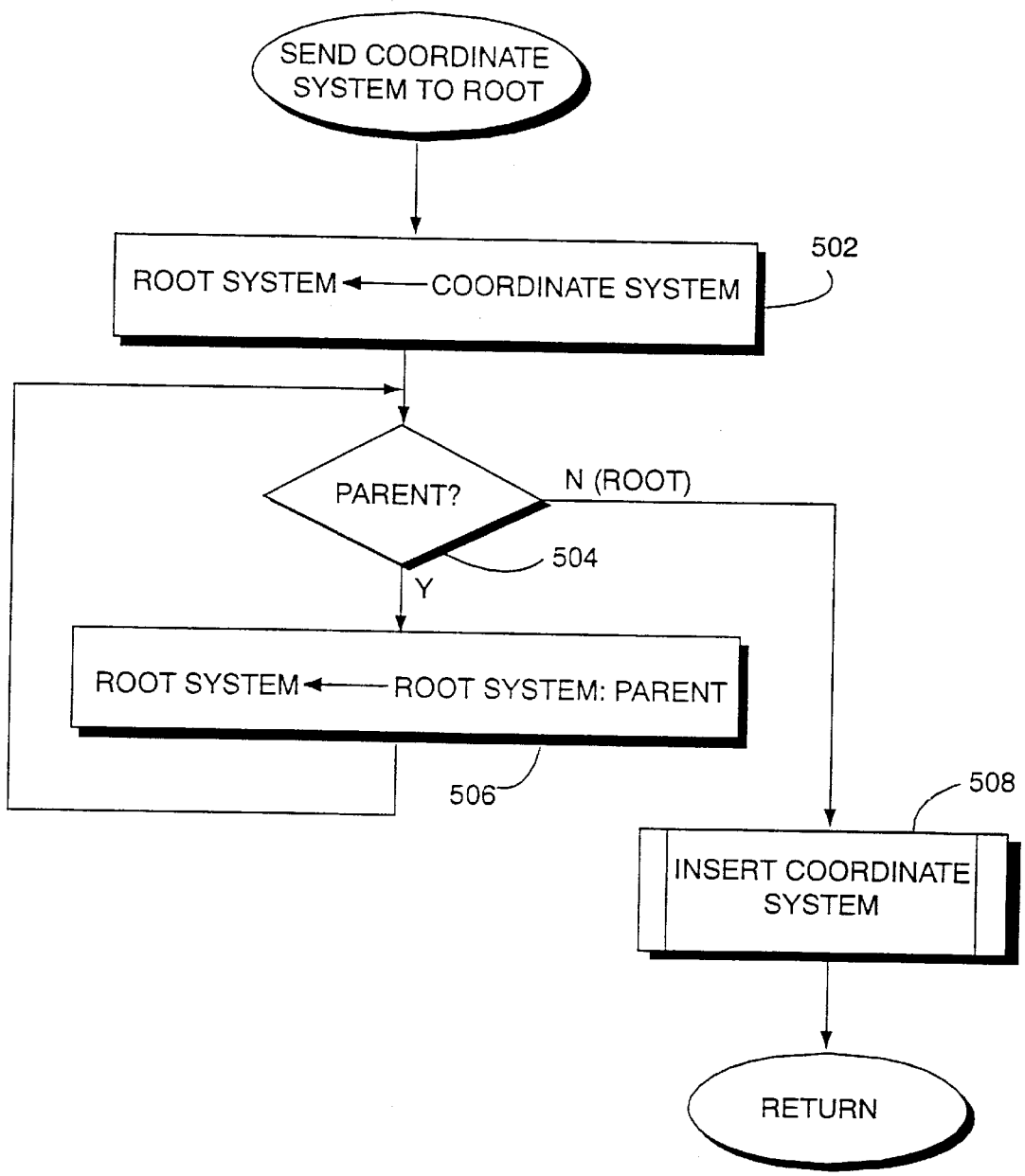

FIG. 9G shows example program control steps performed by an example "send coordinate system to root" function. The example "send coordinate system to root" function finds the root coordinate system of the hierarchy containing the coordinate system to be moved. The coordinate system is then relocated into the space of the root coordinate system. Any child systems attached to the relocated system will also be moved.

Referring to FIG. 9G, the example function first declares a variable "root system" and makes it equal to the coordinate system (FIG. 9G, block 502).

The example function then iteratively sets the root system equal to the root system's parent while the root system's tree node has a parent (FIG. 9G, blocks 504, 506). These steps thus iteratively trace up an existing hierarchical tree structure to locate the root of the tree structure. Once the function locates a coordinate system with no parent (that is, the root) ("no" exit to decision block 504), the example function calls an "insert coordinate system" function to insert the current coordinate system into the space of the root coordinate system (FIG. 9G, block 508).

The following is example pseudo code:
SendCoordSystemToRoot
SendCoordSystemToRoot (Coord System 'coordSystem')
"A function that finds the root Coordinate System of the hierarchy containing the Coordinate System ('coordSystem') to be moved. The Coordinate System is then relocated into the space of the root Coordinate System. Any child systems attached to the relocated system will also be moved."
CODE:
Declare variable ('rootSystem') and make it equal to coordSystem.
While rootSystem's Tree Node has a parent ('rootSystem:Parent'):
Set rootSystem to equal rootSystem:Parent.
If rootSystem equals coordSystem, return from function; coordSystem is the root.
Call InsertCoordSystem(rootSystem, coordSystem).
END.

Example "Set Coordinate System Space" Function

Figure 9H:
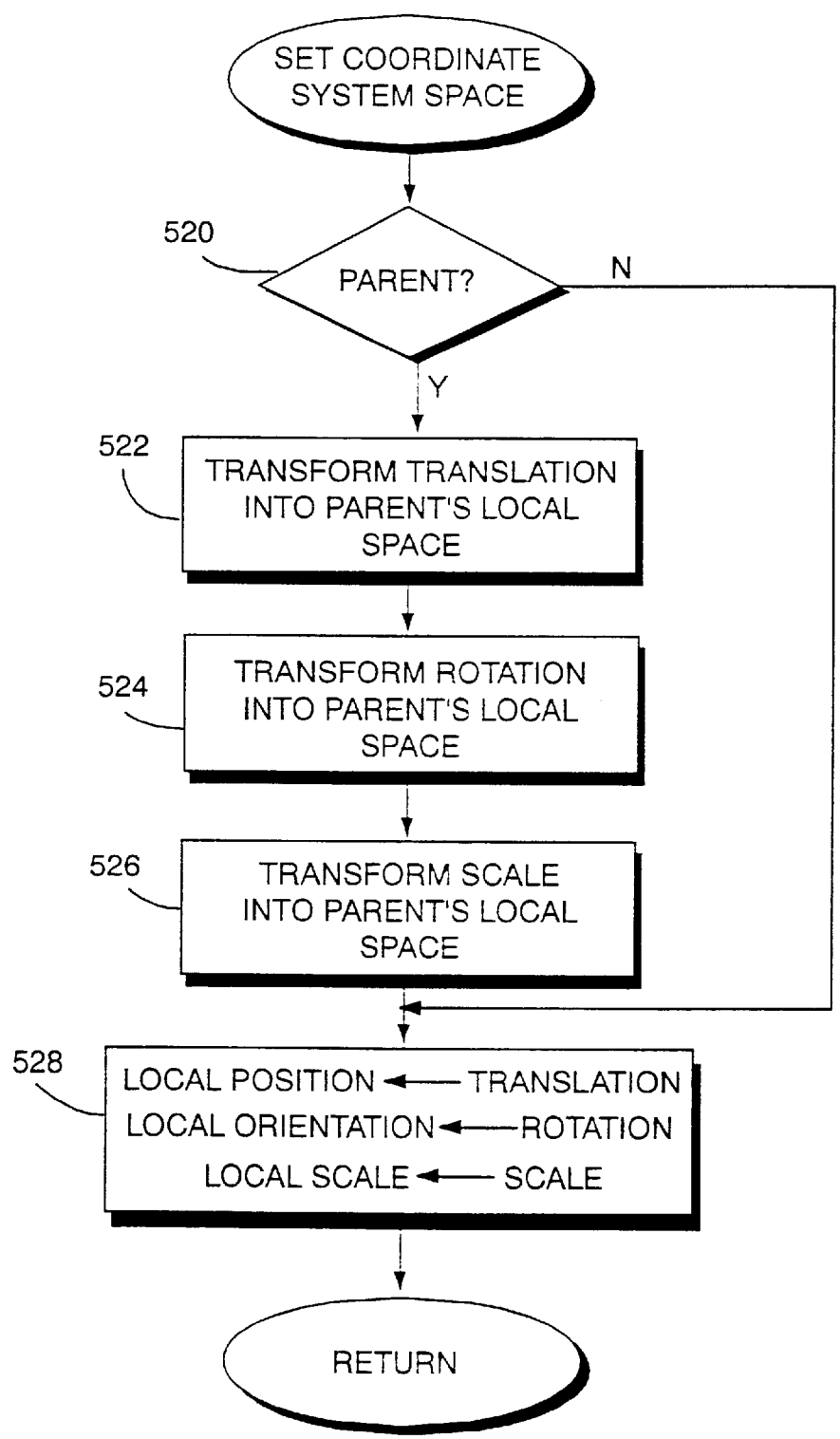

FIG. 9H shows example program control steps for a "set coordinate system space" function. The example function receives, as input parameters, three vectors:
a translation vector;
a rotation vector;
a scale vector.

The example function initializes the internal parameters of a coordinate system so as to describe a space located at the position defined by the translation vector with an orientation defined by the rotation vector and a scale defined by the scale vector.

In this example, the function first determines whether the specified coordinate system has a parent (FIG. 9H, block 520). If it does ("yes" exit to decision block 520), the function transforms the translation vector into the parent's local space—and does the same with the rotation and scale vectors (FIG. 9H, blocks 522, 524, 526). The function next sets the coordinate system's local position component 304 (see FIG. 8B) to equal the (transformed) translation vector; sets the coordinate system's local orientation to equal the (transformed) rotation vector; and sets the coordinate system's local scale component 308 to equal the (transformed) scale vector (FIG. 9H, block 528).

The following is example pseudo code:
SetCoordSystemSpace
SetCoordSystemSpace (CoordSystem 'coordSystem', Vector 'translation', Vector 'rotation', Vector 'scale')
"A function that initialized the internal parameters of a Coordinate System ('coordSystem') so as to describe a space located at ('translation'), with an orientation of ('rotation'), and a scale of ('scale')."
CODE:
If coordSystem's Tree Node has a parent ('coordSystem:Parent'):
Transform translation into coordSystem:Parent's local space.
Transform rotation into coordSystem:Parent's local space.
Transform scale into coordSystem:Parent's local space.
Set coordSystem's local position to equal translation.
Set coordSystem's local orientation to equal rotation.
Set coordSystem's local scale to equal scale.
END.

Example "Vector to Local" Function

FIG. 9I shows example steps performed by an example "vector to local" function provided by the preferred embodiment. In this example, the "vector to local" function transforms a vector residing in world space into the local space of a specified coordinate system. Referring to FIG. 9I, the example function multiplies the specified vector by the inverse matrix 320 of the specified coordinate system, excluding translational attributes (FIG. 9I, block 540).

The following is example pseudo code:
VectorToLocal
VectorToLocal (CoordSystem 'coordSystem', Vector 'vector')
"A function that transforms a vector ('vector') residing in world space into the local space of a Coordinate System ('coordSystem')."
CODE:

Multiply vector by the Inverse Matrix of coordSystem, excluding translational attributes.

END.

Example "Vector To World" Function

Figure 9L:
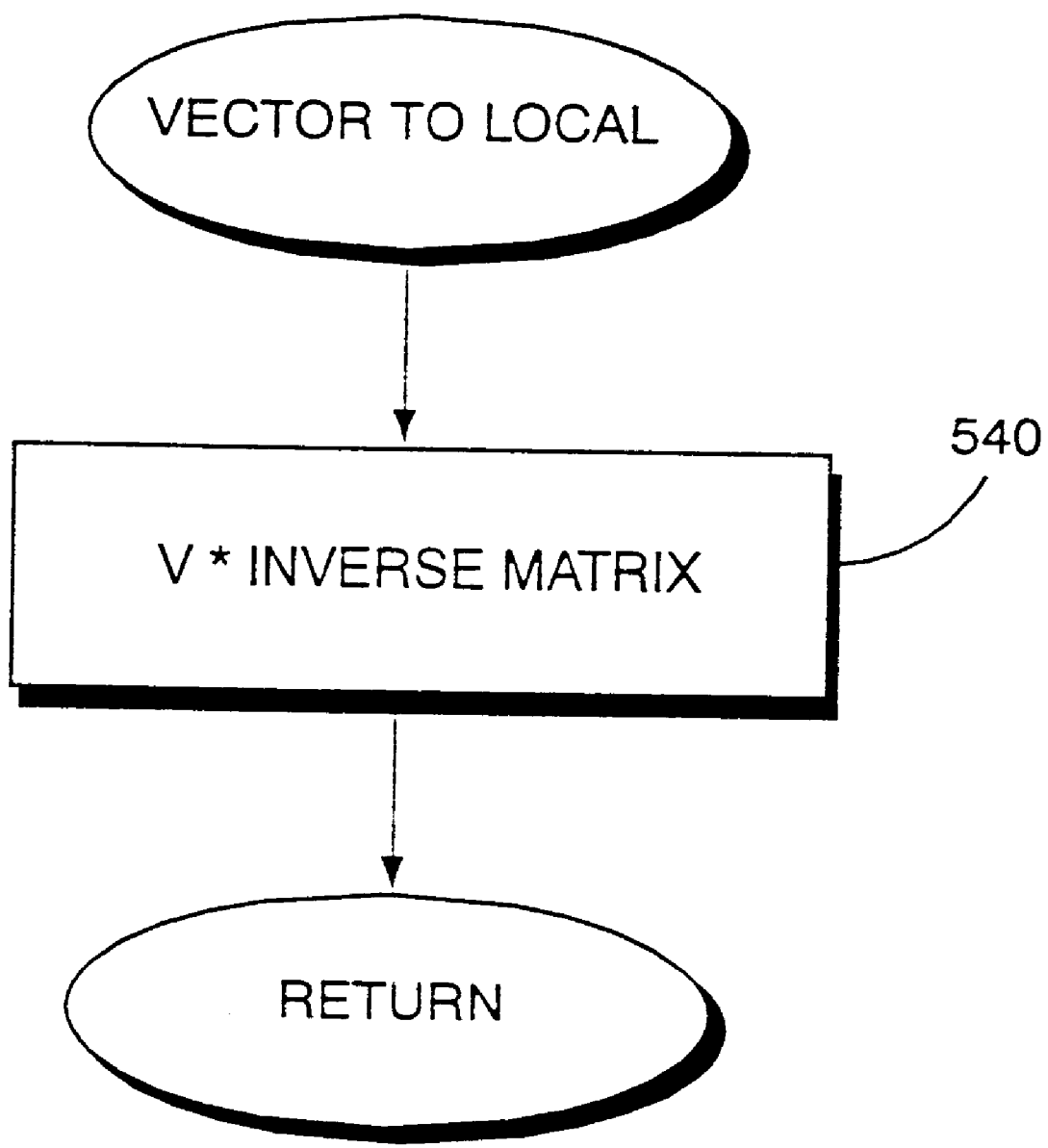
Figure 9J:
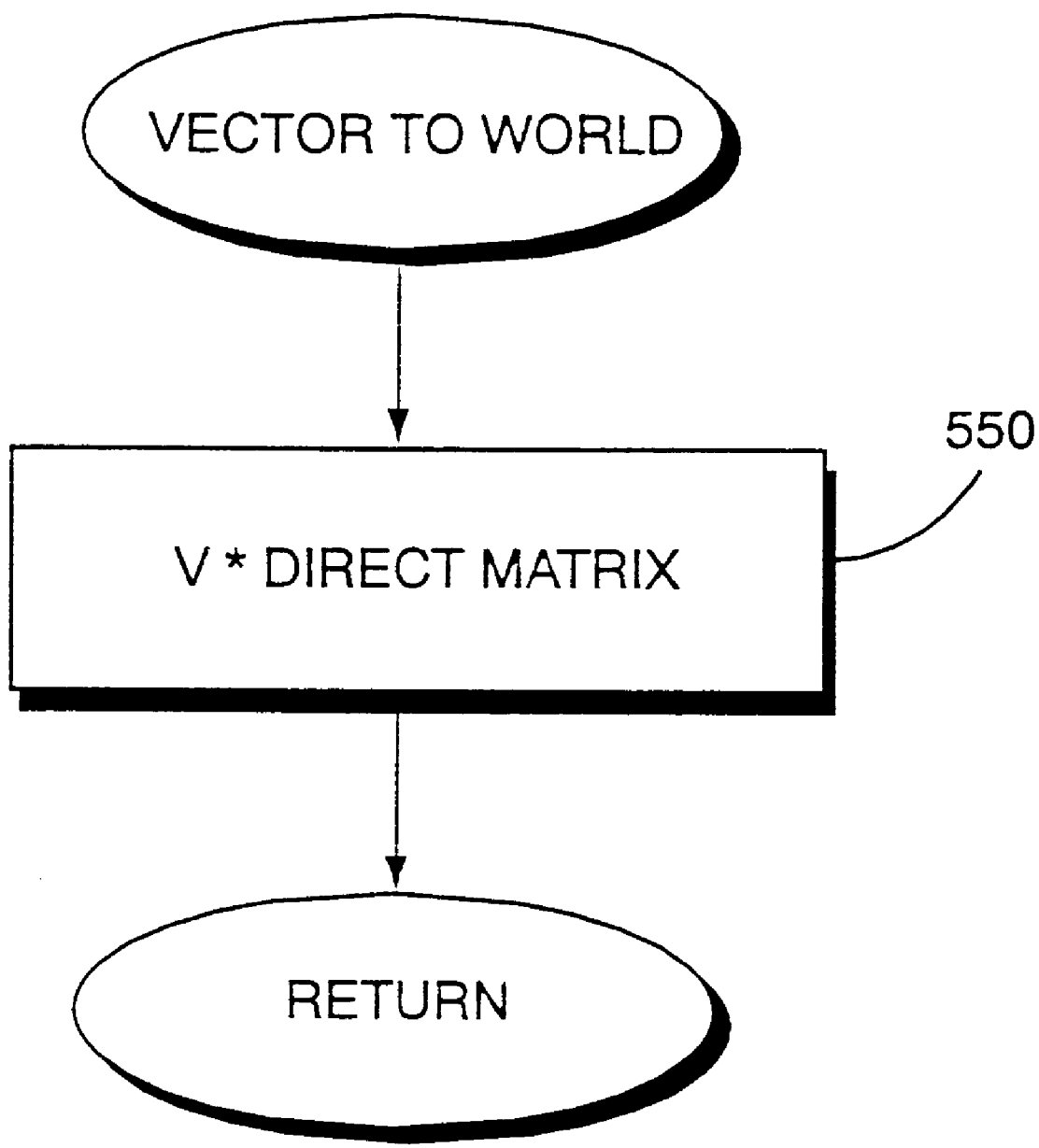

FIG. 9J shows example program control steps performed by a "vector to world" function provided by the preferred embodiment. The example "vector to world" function transforms a specified vector already residing in the local space of a coordinate system into world space. In this example, the function multiplies the vector by the direct matrix 318 of the specified coordinate system, excluding translational attributes (FIG. 9J, block 550).

The following is example pseudo code:
VectorToWorld
VectorToWorld (CoordSystem 'coordSystem', Vector 'vector')
"A function that transforms a vector ('vector') already residing in the local space of a Coordinate System ('coordSystem') into world space."

CODE:

Multiply vector by the Direct Matrix of coordSystem, excluding translational attributes.

END.

Example "Vertex to Local" Function

Figure 9K:
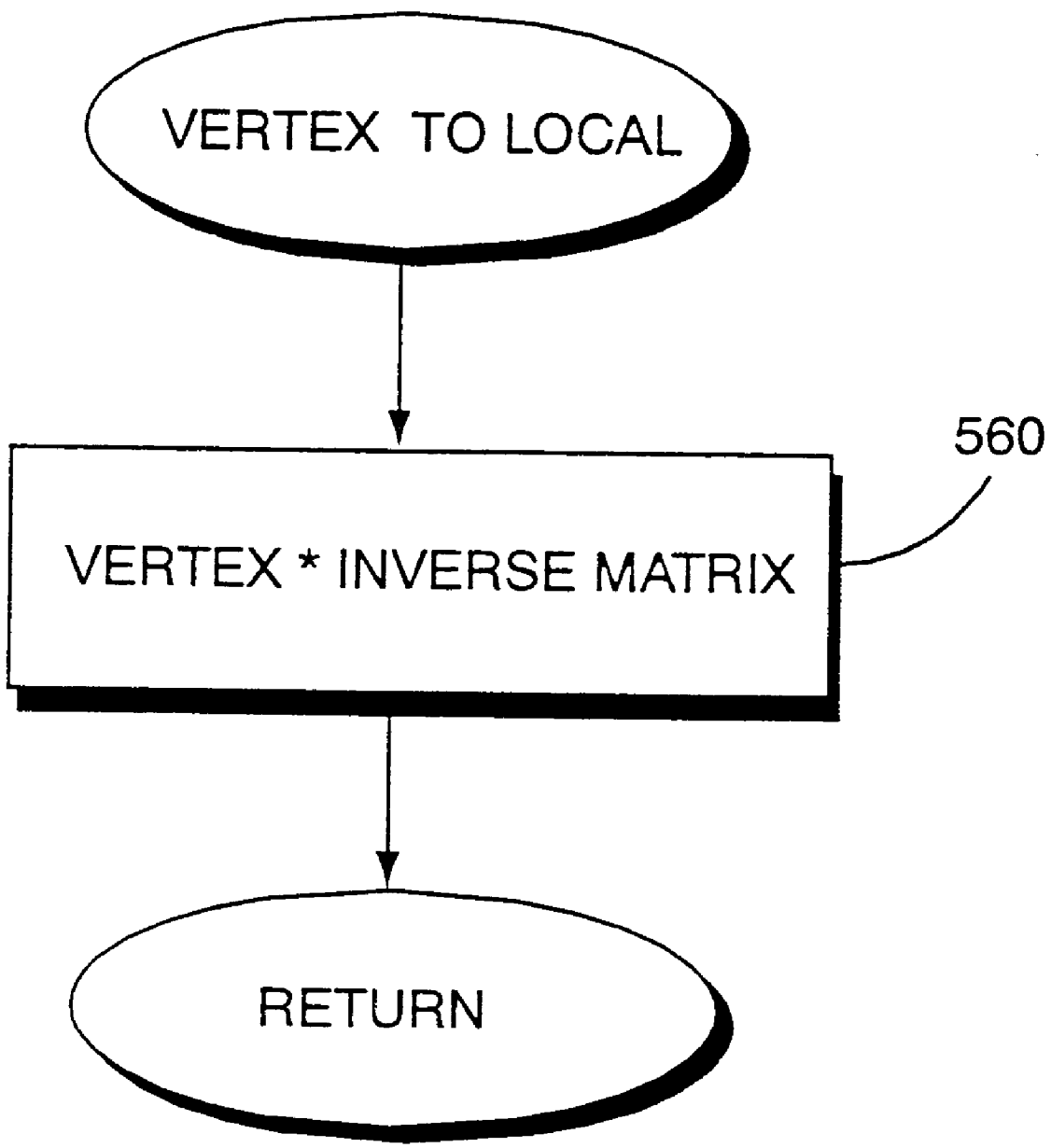
Figure 9L:
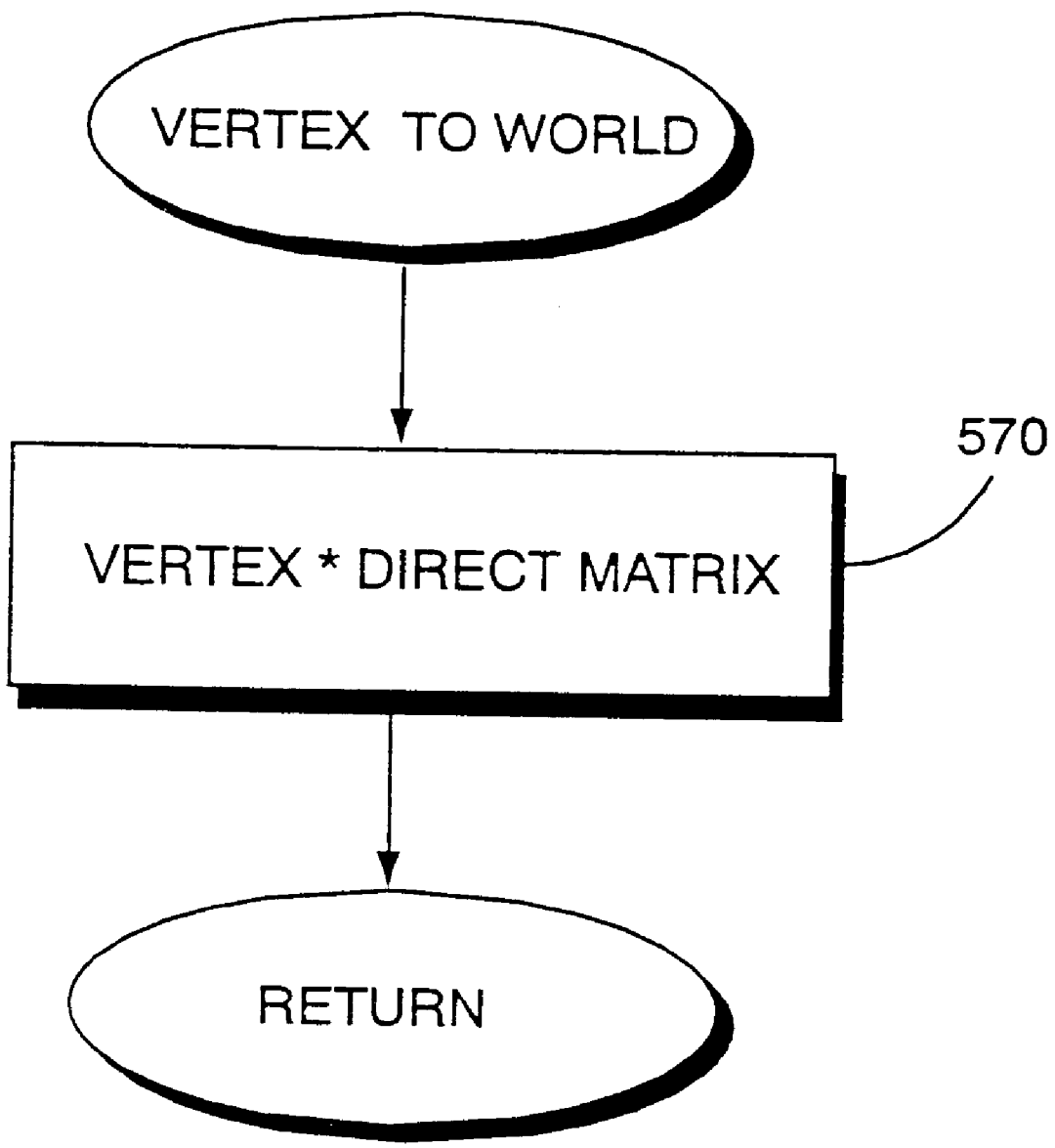

FIG. 9K shows an example "vertex to local" function provided by the preferred embodiment of this invention. The example "vertex to local" function transforms a vertex residing in world space into the local space of a coordinate system. The example function multiples the vertex by the inverse matrix 320 of the specified coordinate system (FIG. 9K, block 560).

The following is example pseudo code:
VertexToLocal
VertexToLocal (CoordSystem 'coordsystem', Vertex 'vertex')
"A function that transforms a vertex ('vertex') residing in world space into the local space of a Coordinate System ('coordSystem')."

CODE:

Multiply vertex by the Inverse Matrix of coordSystem.

END.

Example "Vertex to World" Function

FIG. 9L shows an example "vertex to world" function provided by the preferred embodiment of this invention. The example vertex to world function transforms a vertex already residing in the local space of a coordinate system into world space. In this example, the function multiplies the vertex by the direct matrix 318 of the coordinate system (FIG. 9L, block 570).

The following is example pseudo code:
VertexToWorld
VertexToWorld (CoordSystem 'coordSystem', Vertex 'vertex')
"A function that transforms a vertex ('vertex') already residing in the local space of a Coordinate System ('coordSystem') into world space."

CODE:

Multiply vertex by the Direct Matrix of coordSystem.

END.

Example Programmer Usage of Functions

The transformation mechanisms described above are intended to be used by programmers to maintain geometrical databases in various local spaces during collision in animation processing. When creating geometrical databases, a coordinate system should be maintained for each database to represent local space of that database. When defining the vertices, vectors, etc., that make up the database, a coordinate system should be initialized to identity space using the initialize coordinate system function.

If hierarchy of coordinate systems need to be established for the implementation for direct kinematics, systems may be placed in the hierarchy using the insert coordinate system function. Individual coordinate systems may be removed from the hierarchy with the extract coordinate system function; and groups of systems can be removed with the remove coordinate system function. In a hierarchy of coordinate systems, the root system generally represents world space. Any branch of the hierarchy may be returned to world space using the send coordinate system to root function. Before applying the collision algorithm to a hierarchy of coordinate systems, the final positions of those systems may be determined using the model coordinate system function for a single system—or the model coordinate hierarchy function for a group. It is preferably that these functions be applied before using any coordinate system to transform geometry.

During the execution of the collision algorithm, geometry may be moved in and out of local space using the vector to local, vector to world, vertex to local, and vertex to world functions. This geometry includes the actual motion vectors of the colliding objects as well as the objects themselves. Generally, simpler geometry will be moved into the space of more complex geometry to avoid the overhead transforming the complex geometry. To move or animate a coordinate system, the set coordinate system space function may be called.

FIG. 10 shows example potential uses for the above-described functions in typical collision algorithms. Generally, a programmer will first move objects into shared space using the model coordinate hierarchy, model coordinate system, vertex to local and vertex to world functions (FIG. 10, block 602). The system will then detect collisions resulting from applied forces—using conventional collision detection algorithms and making use of vector to local, vertex to local, vector to world and vertex to world functions (FIG. 10, block 604). The system will then use conventional techniques for resolving collisions by reversing forces (e.g., to cause an image of a ball to bounce off of a surface, for example) (FIG. 10, block 606). The system may further use the set coordinate system space function to compute and apply new forces resulting from collision (FIG. 10, block 608).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an interactive computer graphics system, a method for efficiently detecting collisions between a first object and a second object comprising:

(1) transforming the first object into the local coordinate system of the second object; and (2) testing for collision between the transformed first object and the second object in the second object's local coordinate system.

2. A method as in claim 1 further comprising maintaining an inverse transformation matrix defining a transformation from a world space coordinate system to the second object's local coordinate system, and wherein step (1) comprises using said inverse transformation matrix to transform the first object into the second object's local coordinate system.

3. A method as in claim 1 wherein the first and second objects are both three dimensional, and step (1) comprises mathematically applying at least one 3×3 transformation matrix to parameters associated with the first object.

4. A method as in claim 1 further including displaying the first and second objects interacting in a common world under player control.

5. A video game system comprising:

a user manipulable control allowing the user to interact in real time with the video game system;

a processor coupled to the user manipulable control, the processor performing collision detection between first and second objects in real time by transforming the first object into a local space coordinate system defined with respect to the second object;

a coprocessor coupled to the processor, the coprocessor generating an image including both the first object and the second object within a common world different from said local space coordinate system; and at least one video component coupled to the coprocessor, the video component, in use, enabling said image to be displayed on a display.

6. A video game system as in claim 5 wherein said video component is coupled to a home color television set and enables said image to be displayed on said home color television set.

7. A video game system as in claim 5 further including a memory coupled to said processor, said memory storing an inverse transformation matrix for efficiently transforming said first object into said second object's local space coordinate system.

8. A video game system as in claim 5 further including a memory coupled to said processor, said memory storing a hierarchical data structure defining at least said first and second objects, said hierarchical data structure including at least one transformation matrix and an inverse of said transformation matrix and also including inheritance indicators.

9. A video game system comprising:

a user manipulable control allowing the user to interact in real time with the video game system;

a processor coupled to the user manipulable control, the processor performing collision detection between first and second objects in real time by transforming the first object into a local space coordinate system defined with respect to the second object;

a coprocessor coupled to the processor, the coprocessor generating an image including both the first object and the second object within a common world different from said local space coordinate system; and at least one video component coupled to the coprocessor, the video component, in use, enabling said image to be displayed on a display;

wherein the processor conditions transformation of said first object into the local space coordinate system defined with respect to the second object on determining that the first object is less complex than the second object.

10. A storage medium for use with a video game system of the type including a user manipulable control allowing the user to interact in real time with the video game system, a processor coupled to the user manipulable control, the processor performing collision detection between first and second objects in real time, a coprocessor coupled to the processor, the coprocessor generating an image including both the first object and the second object within a common world different from said local space coordinate system, and at least one video component coupled to the coprocessor, the video component, in use, enabling said image to be displayed on a display, the storage medium storing video game instructions including at least one instruction for transforming the first object into a local space coordinate system defined with respect to the second object and for detecting collisions between said transformed first object and said second object within the local space coordinate system defined with respect to the second object.

11. A storage medium as in claim 10 wherein the storage medium also stores an inverse transformation matrix for efficiently transforming said first object into said second objects local space coordinate system.

12. A storage medium as in claim 10 wherein the storage medium stores a hierarchical data structure defining at least said first and second objects, said hierarchical data structure including at least one transformation matrix and an inverse of said transformation matrix and also including inheritance indicators.

13. A storage medium for use with a video same system of the type including a user manipulable control allowing the user to interact in real time with the video game system, a processor coupled to the user manipulable control, the processor performing collision detection between first and second objects in real time, a coprocessor coupled to the processor, the coprocessor generating an image including both the first object and the second object within a common world different from said local space coordinate system, and at least one video component coupled to the coprocessor, the video component, in use, enabling said image to be displayed on a display, the storage medium storing video game instructions including at least one instruction for transforming the first object into a local space coordinate system defined with respect to the second object and for detecting collisions between said transformed first object and said second object within the local space coordinate system defined with respect to the second object;

wherein the storage medium further stores instructions that condition transformation of said first object into the local space coordinate system defined with respect to the second object based on a determination that the first object is less complex than the second object.

14. A video game system for use with a display, said system comprising:

means for allowing a user to interact in real time with the video game system;

processing means coupled to the user manipulable control for performing collision detection between first and second objects in real time, including means for transforming the first object into a local space coordinate system defined with respect to the second object;

means coupled to the processing means for generating an image including both the first object and the second object within a common world different from said local space coordinate system enabling said image to be displayed on the display.

15. A video game system as in claim 14 wherein said image generating means is coupled to a home color television set and enables said image to be displayed on said home color television set.

16. A video game system as in claim 14 further including means coupled to said processing means for storing an inverse transformation matrix for efficiently transforming said first object into said second object's local space coordinate system.

17. A video game system as in claim 14 further including means coupled to said processing means for storing a hierarchical data structure defining at least said first and second objects, said hierarchical data structure including at least one transformation matrix and an inverse of said transformation matrix and also including inheritance indicators.

18. A video game system for use with a display, said system comprising:

means for allowing a user to interact in real time with the video game system;

processing means coupled to the user manipulable control for performing collision detection between first and second objects in real time, including means for transforming the first object into a local space coordinate system defined with respect to the second object;

means coupled to the processing means for generating an image including both the first object and the second object within a common world different from said local space coordinate system enabling said image to be displayed on the display;

wherein the processing means includes means for conditioning transformation of said first object into the local space coordinate system defined with respect to the second object on determining that the first object is less complex than the second object.

* * * * *